United States Patent
Johnson et al.

(10) Patent No.: US 12,465,881 B2
(45) Date of Patent: Nov. 11, 2025

(54) AIR FILTER SYSTEMS, FILTER BAG ASSEMBLIES, FILTER BAGS AND METHODS

(71) Applicant: Donaldson Company, Inc., Bloomington, MN (US)

(72) Inventors: Steven A. Johnson, Lugano (CH); Gabriel J. Safarian, Deephaven, MN (US); David V. Gutman, Brussels (BE); David L. Van Eylen, Herverlee (BE); Benny J.B. Mombaerts, Boortmeerbeek (BE); Eric W.E. Collin, Bilzen (BE); Iman Vezvaei, Brussels (BE)

(73) Assignee: Donaldson Company, Inc., Bloomington, MN (US)

( * ) Notice: Subject to any disclaimer, the term of this patent is extended or adjusted under 35 U.S.C. 154(b) by 0 days.

(21) Appl. No.: 18/543,736

(22) Filed: Dec. 18, 2023

(65) Prior Publication Data

US 2024/0115983 A1    Apr. 11, 2024

Related U.S. Application Data

(62) Division of application No. 17/017,927, filed on Sep. 11, 2020, now Pat. No. 11,883,763.

(Continued)

(51) Int. Cl.
*B01D 46/02* (2006.01)
*B01D 46/00* (2022.01)
(Continued)

(52) U.S. Cl.
CPC ......... *B01D 46/04* (2013.01); *B01D 46/0005* (2013.01); *B01D 46/02* (2013.01); *B01D 46/2414* (2013.01); *B01D 46/71* (2022.01)

(58) Field of Classification Search
CPC ..... B01D 46/00; B01D 46/0005; B01D 46/02
See application file for complete search history.

(56) References Cited

U.S. PATENT DOCUMENTS

| 2,576,310 A | 11/1951 | Ruemelin |
| 2,853,154 A | 9/1958 | Rivers |

(Continued)

FOREIGN PATENT DOCUMENTS

| BE | 571580 | 10/1958 |
| CN | 103082950 A | 5/2013 |

(Continued)

OTHER PUBLICATIONS

Donaldson® Torit® Product Information Brochure, "Dalamatic® Dust Collectors", 2011-2018, Donaldson Company, Inc., Minneapolis, Minnesota, 12 pages.

(Continued)

*Primary Examiner* — Robert A Hopkins
(74) *Attorney, Agent, or Firm* — Mueting Raasch Group

(57) ABSTRACT

Air filter systems, filter bag assemblies, filter bags and corresponding methods are described herein. Air filter systems, filter bag assemblies, filter bags and corresponding methods are described herein. The filter bag assemblies include a flange assembly, a cage attached to the flange assembly, and a filter bag installed over the cage with an opening at the flange assembly. When installed in the dirty air chamber of the air filter system, a seal between the flange assembly and the tubesheet defining the dirty air chamber is provided by applying a seal force on the end of the filter bag assembly located proximate the access panel on the side of the dirty air chamber opposite the tubesheet. That seal force is transmitted to the flange assembly through the cage. The (Continued)

tubular filter bags may be in the form of triangular bags and/or may include bag support connectors at the closed end of the bag.

8 Claims, 24 Drawing Sheets

Related U.S. Application Data

(60) Provisional application No. 62/899,938, filed on Sep. 13, 2019.

(51) Int. Cl.
*B01D 46/04* (2006.01)
*B01D 46/24* (2006.01)
*B01D 46/71* (2022.01)

(56) References Cited

U.S. PATENT DOCUMENTS

| | | |
|---|---|---|
| 3,803,814 A | 4/1974 | Parsons |
| 3,942,962 A | 3/1976 | Duyckinck |
| 4,072,484 A | 2/1978 | Carre et al. |
| 4,080,185 A | 3/1978 | Richter et al. |
| 4,123,239 A | 10/1978 | Andersson et al. |
| 4,218,227 A | 8/1980 | Frey |
| 4,298,360 A | 11/1981 | Poll |
| 4,306,896 A | 12/1981 | O'Dell |
| 4,390,425 A | 6/1983 | Tafara et al. |
| 4,395,269 A | 7/1983 | Schuler |
| 4,424,070 A | 1/1984 | Robinson |
| 4,436,536 A | 3/1984 | Robinson |
| 4,443,237 A | 4/1984 | Ulvestad |
| 4,445,915 A | 5/1984 | Robinson |
| 4,490,253 A | 12/1984 | Tafara |
| 4,539,025 A | 9/1985 | Ciliberti et al. |
| 4,578,092 A | 3/1986 | Klimczak |
| 4,613,438 A | 9/1986 | DeGraffenreid |
| 4,632,681 A | 12/1986 | Brunner |
| 4,661,131 A | 4/1987 | Howeth |
| 4,954,255 A | 9/1990 | Müller et al. |
| 5,207,812 A | 5/1993 | Tronto et al. |
| 5,211,846 A | 5/1993 | Kott et al. |
| 5,222,488 A | 6/1993 | Forsgren |
| 5,409,515 A | 4/1995 | Yamamoto et al. |
| 5,484,529 A | 1/1996 | Malugade et al. |
| 5,562,746 A | 10/1996 | Raether |
| 5,730,766 A | 3/1998 | Clements |
| 6,090,173 A | 7/2000 | Johnson et al. |
| 6,179,890 B1 | 1/2001 | Ramos et al. |
| 6,183,530 B1 | 2/2001 | Herding et al. |
| 6,203,591 B1 | 3/2001 | Clements et al. |
| 6,331,197 B1 | 12/2001 | Herding et al. |
| 6,902,592 B2 | 6/2005 | Green et al. |
| 7,182,799 B2 | 2/2007 | Dries |
| 7,396,376 B2 | 7/2008 | Schrage et al. |
| 7,641,708 B2 | 1/2010 | Kosmider et al. |
| 7,901,476 B2 | 3/2011 | Kao |
| 8,029,585 B2 | 10/2011 | Sundvik et al. |
| 8,075,648 B2 | 12/2011 | Raether |
| 8,409,315 B2 | 4/2013 | Nelson et al. |
| 8,636,820 B2 | 1/2014 | Reichter et al. |
| 8,709,119 B2 | 4/2014 | Reichter et al. |
| 9,623,355 B2 | 4/2017 | Caesar et al. |
| 9,707,503 B2 | 7/2017 | Gieseke et al. |
| 10,105,628 B2 | 10/2018 | Arrazola De Oñate |
| 10,124,285 B2 | 11/2018 | Baseotto et al. |
| 10,137,396 B2 | 11/2018 | Raether et al. |
| 10,421,034 B2 | 9/2019 | Reichter et al. |
| 11,529,576 B2 | 12/2022 | Herding et al. |
| 2006/0112667 A1 | 6/2006 | Sporre et al. |
| 2007/0218833 A1 | 9/2007 | Andersson |
| 2009/0183473 A1 | 7/2009 | Hui |
| 2014/0260138 A1 | 9/2014 | Edwards et al. |
| 2015/0128540 A1 | 5/2015 | Eyers et al. |
| 2015/0182899 A1 | 7/2015 | Bansal et al. |
| 2015/0314225 A1 | 11/2015 | Parsons et al. |
| 2016/0016103 A1 | 1/2016 | Raether |
| 2019/0308126 A1 | 10/2019 | Fritzsching et al. |
| 2021/0077934 A1 | 3/2021 | Johnson et al. |
| 2022/0297041 A1 | 9/2022 | Gutman et al. |
| 2022/0297046 A1 | 9/2022 | Collin et al. |
| 2023/0191303 A1 | 6/2023 | Graham et al. |

FOREIGN PATENT DOCUMENTS

| | | |
|---|---|---|
| CN | 103089714 | 5/2013 |
| CN | 105749638 | 7/2016 |
| CN | 206404468 | 8/2017 |
| CN | 107321078 | 11/2017 |
| CN | 107349711 | 11/2017 |
| DE | 202020105243 | 12/2020 |
| EP | 3 150 269 | 4/2017 |
| EP | 3 680 002 | 7/2020 |
| FR | 2 561 535 | 9/1985 |
| FR | 2 561 536 | 9/1985 |
| GB | 1113154 | 5/1968 |
| JP | H073712 U * | 1/1995 |
| NL | 1013824 | 6/2001 |
| WO | 2013/038757 | 3/2013 |
| WO | 2016/141097 | 9/2016 |
| WO | 2021/006927 | 1/2021 |
| WO | 2021/050817 | 3/2021 |
| WO | 2021/074139 | 4/2021 |
| WO | 2021/074143 | 4/2021 |
| WO | 2022/063470 | 3/2022 |
| WO | 2022/197631 | 9/2022 |
| WO | 2022/197632 | 9/2022 |
| WO | 2023/122106 | 6/2023 |

OTHER PUBLICATIONS

Donaldson® Torit® Product Information, "Dalamatic®: Reliable Performance for the Most Challenging Applications", Donaldson Company, Inc., Minneapolis, Minnesota. Believed available as early as Feb. 26, 2019. Obtained from the internet Jun. 18, 2021, 14 pages. Available online at https://www.donaldson.com/en-us/industrial-dust-fume-mist/equipment/dust-collectors/baghouse/dalamatic/.

International Patent Application No. PCT/US2020/050315, filed Sep. 11, 2020; International Search Report and Written Opinion, mailed Feb. 4, 2021, 18 pages.

International Patent Application No. PCT/US2020/050315, filed Sep. 11, 2020; Invitation to Pay Additional Fees and Partial International Search Report, mailed Nov. 20, 2020; 11 pages.

International Patent Application No. PCT/US2020/050315, filed Sep. 11, 2020; International Preliminary Report on Patentability issued Mar. 15, 2022, 12 pages.

International Application No. PCT/US2022/020237, filed Mar. 14, 2022; PCT International Search Report and Written Opinion mailed May 6, 2022, 10 pages.

Donaldson® Torit® Installation and Operation Manual, "Dalamatic® Insertable: DLMV 4/7, 7/7, 8/7, 14/7, 21/7, 6/10, 10/10, 12/10, 20/10, 30/10, 9/15, 15/15, 18/15, 30/15, 45/15, 60/15", Revision 7, Mar. 2016, originally published 2002, Donaldson Company, Inc., Minneapolis, Minnesota, 36 pages.

Donaldson® Torit® Installation and Operation Manual, "Dalamatic® Cased: DLMC Jan. 2, 2015, Jan. 3, 2015, Jan. 4, 2015, Jan. 5, 2015, Jan. 7, 2015, Feb. 2, 2015, Feb. 3, 2015, Feb. 4, 2015, Feb. 5, 2015, Feb. 6, 2015, Feb. 8, 2015, Mar. 3, 2015, Mar. 5, 2015, Mar. 6, 2015, Mar. 7, 2015, Mar. 8, 2015, Apr. 5, 2015 and Apr. 8, 2015—Collectors Built After Jul. 2006", Revision 5, Feb. 2023, originally published 2006, Donaldson Company, Inc., Minneapolis, Minnesota, 40 pages.

International Application No. PCT/US2022/053540, filed Dec. 20, 2022 PCT International Search Report and Written Opinion mailed Mar. 31, 2023, 10 pages.

* cited by examiner

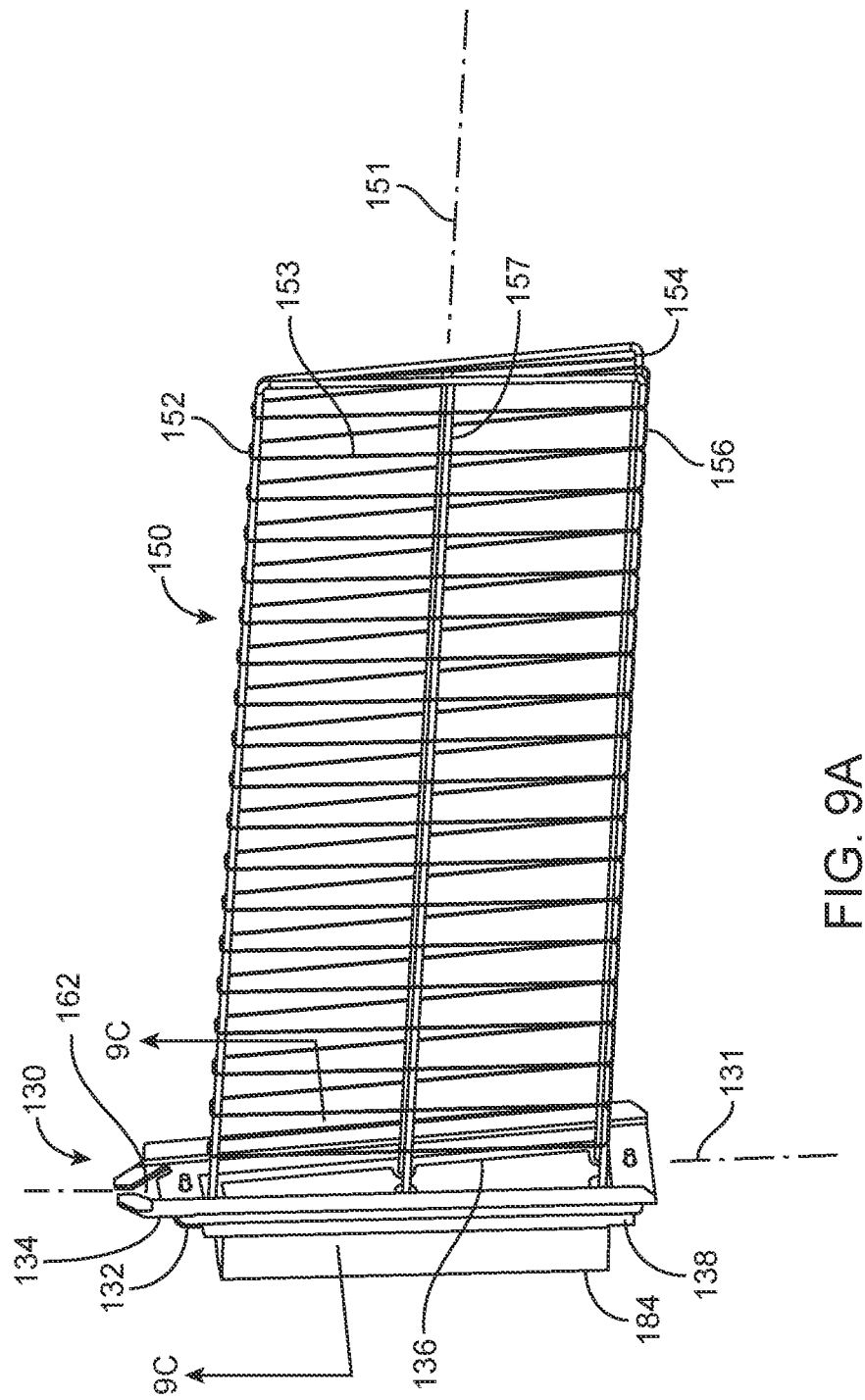

AIR FILTER SYSTEMS, FILTER BAG ASSEMBLIES, FILTER BAGS AND METHODS

RELATED APPLICATION

The present application is a division of U.S. patent application Ser. No. 17/017,927, filed on 11 Sep. 2020, which claims the benefit of U.S. Provisional Application Ser. No. 62/899,938 filed 13 Sep. 2019, entitled AIR FILTER SYSTEMS, FILTER BAG ASSEMBLIES, FILTER BAGS AND METHODS, the disclosures of which are incorporated by reference in their entireties.

Air filter systems, filter bag assemblies, and filter bags along with corresponding methods are described herein.

Many industries encounter particulate matter suspended in the atmosphere. In some industries, this particulate matter is a valuable product (for example, starch), and it would be beneficial if the suspended particulate matter could be recovered and reintroduced into the process. For other industries (for example, metal or wood working), it may be desirable to remove the particulate matter from the air in order to provide a clear working environment.

Some systems for cleaning an air or other gas streams laden with particulate matter include filter bags (sometimes referred to as socks) located in a housing. The filter bags are typically constructed of filter media, e.g., fabric, pleated paper, etc. The gas stream contaminated with particulate matter is typically passed through the housing so that the particulate matter is captured and retained by one or more filter bags.

Air filter systems typically include a clean air chamber and a dirty air chamber. The two chambers are separated by a structure that is commonly referred to as a tubesheet. The tubesheet has a number of openings so that air can pass between the clean and dirty air chambers. The filter bags are positioned over the openings so that particulate-laden air (dirty air) introduced into the dirty air chamber must pass through a filter bag to move into the clean air chamber. The particulate matter in the dirty air collects on the filter bags as the air moves through the filter bags.

From the clean air chamber, the cleaned air is exhausted into the environment, or recirculated for other uses. See, for example, U.S. Pat. No. 3,942,962 (Duyckinck), U.S. Pat. No. 4,218,227 (Frey), U.S. Pat. No. 4,424,070 (Robinson), U.S. Pat. No. 4,436,536 (Robinson), U.S. Pat. No. 4,443,237 (Ulvestad), U.S. Pat. No. 4,445,915 (Robinson), U.S. Pat. No. 4,661,131 (Howeth), U.S. Pat. No. 5,207,812 (Tronto et al.), U.S. Pat. No. 4,954,255 (Muller et al.), U.S. Pat. No. 5,222,488 (Forsgren), U.S. Pat. No. 5,211,846 (Kott et al.), U.S. Pat. No. 5,730,766 (Clements), U.S. Pat. No. 6,090,173 (Johnson et al.), U.S. Pat. No. 6,902,592 (Green et al.), and U.S. Pat. No. 7,641,708 (Kosmider et al.).

As the filter bags capture particulate matter, flow through the system is inhibited and periodic cleaning of the filter bags can be performed to increase air flow through the system. Cleaning can be accomplished by periodically pulsing a brief jet of pressurized air into the interior of the filter bag to reverse the air flow through the filter bag, causing the collected particulate matter to be driven off of the filter bag. The pressurized air may be directed into pulse collectors as described in, e.g., U.S. Pat. No. 3,942,962 (Duyckinck), U.S. Pat. No. 4,218,227 (Frey), U.S. Pat. No. 6,090,173 (Johnson et al.), U.S. Pat. Nos. 4,395,269, 6,902,592 (Green et al.), U.S. Pat. No. 7,641,708 (Kosmider et al.), and US Patent Application Publication US 2006/0112667 A1.

SUMMARY

Air filter systems, filter bag assemblies, filter bags and corresponding methods are described herein.

In one or more embodiments, the filter bag assemblies include a flange assembly, a cage attached to the flange assembly, and a filter bag installed over the cage with an opening at the flange assembly. When installed in the dirty air chamber of the air filter system, a seal between the flange assembly and the tubesheet defining the dirty air chamber is provided by applying a seal force on the end of the filter bag assembly located proximate the access panel on the side of the dirty air chamber opposite the tubesheet. That seal force is transmitted to the flange assembly through the cage.

Providing the seal force at the end of the filter bag assembly and transmitting that force through the cage to the flange assembly allows for removal and replacement of the filter bags (and the filter bag assemblies) through access ports on an access panel located across the dirty air chamber. As a result, the used filter bags (and the particulate matter collected on them) do not pass through, and potentially contaminate, the clean air chamber of the air filter system.

Another potential advantage of providing and transmitting a seal force at the end of the filter bag assembly and transmitting that force through the cage to the flange assembly is that other components such as, e.g., pulse generators, etc. need not be removed or even partially disassembled to accommodate removal and replacement of filter bags.

Forming a seal using a filter bag by transmitting a seal force through a cage located in the interior of the filter bag may also improve pulse cleaning of at least some types of particulate matter because the rapid acceleration associated with pulse cleaning of some filter bags (sometimes referred to as "bag snap") can be retained (as compared to, e.g., the pulse cleaning of rigid filter cartridges).

In one or more embodiments, the filter bag assemblies described herein may include the triangular filter bags may be described as having the shape of triangular columns, with a height or length of the column being arranged generally horizontally within the dirty air chamber and a bottom surface of the triangular filter bags facing downward. In one or more embodiments, the bottom surfaces of the filter bags are rapidly accelerated downward during pulse cleaning. As a result, particulate matter dislodged from the bottom surfaces of the filter bags during pulse cleaning is advantageously driven directly into a hopper of the filter system under the force of the filter media movement in addition to the force of gravity.

In one or more embodiments, pulse cleaning of the triangular-shaped filter bags also results in rapid outward acceleration of the side surfaces of the triangular-shaped filter bags similar to that found in conventional envelope shaped filter bags. That rapid outward acceleration may result in dislodgment of particulate matter collected on those side surfaces similar to dislodgment in conventional envelope shaped filter bags, with the dislodged particulate matter also falling into a hopper of the filter system under the force of gravity. The combination of bottom facing surfaces and side surfaces found in the triangular-shaped filter bags described herein results in a synergistic effect in which particulate loading and pulse cleaning are both improved over conventionally shaped filter bags.

In one or more embodiments in which the generally horizontally-arranged triangular filter bags have the shape of triangular columns with downward facing bottom surfaces, the width of the bottom surfaces may be smaller than the height of the side surfaces measured from the top vertex of the triangular shaped filter bag (where the width of the bottom surface is measured between the vertices defining the bottom surface in a plane that is generally transverse to the column height/length and the height of the side surfaces being measured between the top vertex and the bottom vertex defining the side surface). In one or more embodiments, the width of the bottom surface may be 50% or less, 40% or less, 30% or less, 20% or less, 15% or less, 12% or less, 10% or less, 8% or less, or 5% or less of the height of either side surface of the pair of side surfaces. At a lower end, the width of the bottom surface may be 4% or more, 5% or more, 6% or more, 8% or more, 10% or more, 12% or more, 15% or more of the height of either side surface of the pair of side surfaces.

In one or more embodiments in which the generally horizontally-arranged triangular filter bags have the shape of triangular columns with downward facing bottom surfaces, triangular-shaped bags and/or the cages used to support them may be described with respect to the included angle formed between the side surfaces at the tops of the triangles. In one or more embodiments, the angle formed between the side surfaces at the vertex/apex/top of the triangular shaped bags and/or cages may be 45° or less, 30° or less, 20° or less, 15° or less, 12° or less, 10° or less, or 5° or less. At the lower end. the included angle may, in one or more embodiments, be 2° or more, 3° or more, 4° or more, or 5° or more.

In one or more embodiments of triangular filter bags including a triangular end cap attached to a tubular body, the triangular end cap, when projected onto a flat surface along a bag axis extending from the bag opening to the triangular end cap, defines a height between the apex and the bottom edge and also defines a width across the bottom edge between the side edges. In one or more embodiments, the height may be 4 or more, 6 or more, 8 or more, 10 or more, 12 or more, or 15 or more times the width, and, at an upper end, the height may optionally be 20 or less, 15 or less, 12 or less, 10 or less, 8 or less, or 6 or less times the width.

In one or more embodiments, air filter systems using generally horizontally-arranged filter bags shaped or formed into triangular cross-sections as described herein may exhibit improved particulate loading capacity because the filter media forming the bottom surfaces or bases of the triangles face downward. The downward facing filter media may, in or more embodiments, be less susceptible to particulate loading during use than filter media facing upward (in addition to enhancing pulse cleaning by releasing dislodged particulate matter downward where it may, for example, land directly in a hopper located below the filter bags).

Further, by limiting the width of the bottom surfaces of the triangular-shaped filter bags, the side surfaces of the triangular-shaped filter bag assemblies form relatively steep vertical angles having generally vertical side surfaces. Those generally vertical side surfaces may serve to limit particulate loading on the side surfaces (as compared to, e.g., side surfaces arranged at shallower angles). The generally vertical side surfaces that are the result of the relatively steep vertical angles also promote release of particulate matter collected on those side surfaces during the pulse cleaning process.

In one or more embodiments of the air filter systems described herein including triangular filter bags, the filter bags are supported in a dirty air chamber such that the filter bags and their supporting assemblies (e.g., flange assemblies, cages, etc.) can be removed and replaced without passing through the clean air chamber of the air filter system. That limits or prevents contamination of the clean air chamber by particulate matter dislodged during removal of used filter bags that is associated with removal of used filter bags through the clean air chamber.

Air filter systems that include one or more of the various features and components described herein may offer one or more advantages such as, e.g., improved energy efficiency, reduced noise generation, etc. by, in one or more embodiments, reduced pressure drops within the air filter systems both during primary flow operation and pulse cleaning of the filter elements (where primary flow operation occurs when the air filter system is removing particulate matter from a dirty air stream), reducing frictional losses in the air filter systems (both during primary flow operation and pulse cleaning of the filter bags, improving particulate loading characteristics (thus potentially requiring fewer cleaning pulses), etc.

The air filter systems, filter bag assemblies and filter bags described herein are designed for use in industrial air filter applications in which particulate matter must be removed from relatively large volumes of dirty air. As such, the filter bags and filter bag assemblies must be sized to handle those air volumes and the particulate matter associated with the volumes. Generally, the filter bags described herein may have a bag length measured from the bag opening to the closed end of the bag that is 0.3 meters or more, 0.5 meters or more, or even 1 meter or more. The associated bag height (measured transverse to the length of the bag) may be 0.2 meters or more, 0.3. meters or more, 0.4 meters or more, or 0.5 meters or more.

These advantages may, in one or more embodiments be synergistic, i.e., the energy efficiency, reduced noise, etc. may be improved by using two or more of the features and/or components together in the same air filter systems.

In a first aspect, one or more embodiments of the air filter systems described herein may include: a tubesheet separating a housing into a dirty air chamber and a clean air chamber, wherein the tubesheet comprises an aperture placing the dirty air chamber in fluid communication with the clean air chamber, and wherein the housing comprises an access panel located across the dirty air chamber from the tubesheet; a filter bag assembly located in the dirty air chamber, the filter bag assembly comprising: a flange assembly comprising an interior face and a tubesheet face facing the tubesheet, the flange assembly surrounding the aperture in the tubesheet and comprising a clean air outlet extending through the flange assembly, the clean air outlet in fluid communication with the aperture in the tubesheet; a cage comprising a first cage end attached to the flange assembly and extending over a cage length to a second cage end distal from the flange assembly, the cage defining a cage axis extending between the first cage end and the second cage end, the cage further comprising a plurality of struts extending away from the interior face of the flange assembly towards the second cage end; and a filter bag comprising filter media defining an interior volume of the filter bag, wherein the filter bag extends from a first end to a second end, wherein a portion of the filter media defines a bag opening at the first end of the filter bag; wherein the bag opening is attached to flange assembly, wherein the bag opening and the flange assembly form a seal around the clean air outlet such that air entering the interior volume of the filter bag must pass through the filter media of the filter bag or through the clean air outlet of the flange assembly; a filter access port in the access panel of the housing, the filter access port comprising a cover movable between a closed position and an open position, wherein the cover closes the filter access port when the cover is in the closed position and wherein the filter bag assembly can be inserted into or removed from the dirty air chamber through the filter access port when the cover is in the open position; a seal located around the aperture in the tubesheet between the tubesheet face of the flange assembly and the tubesheet such that air passing through the aperture in the tubesheet must pass through the clean air outlet in the flange assembly before entering or leaving the interior volume of the filter bag; a seal actuator proximate the filter access port in the access panel, the seal actuator configured to apply a seal force on the second cage end through the second end of the filter bag, wherein the seal force is directed along the cage axis and is transferred to the seal through the cage and the flange assembly; and a pulse generator located in the clean air chamber and configured to deliver pulses of air into the interior volume of the filter bag through the aperture in the tubesheet and the clean air outlet of the flange assembly, the pulses of air passing through the aperture and the clean air outlet before reaching the interior volume of the filter bag.

In a second aspect, one or more embodiments of a filter bag assembly as described herein may include: a flange assembly comprising an interior face and a tubesheet face, the flange assembly comprising a clean air outlet extending through the flange assembly, wherein the clean air outlet extends from a top end to a bottom end, wherein an outlet axis extends between the top end and the bottom end of the clean air outlet; a cage comprising a first cage end attached to the flange assembly and extending over a cage length to a second cage end distal from the flange assembly, the cage defining a cage axis extending between the first cage end and the second cage end, the cage further comprising a plurality of struts extending away from the interior face of the flange assembly towards the second cage end, wherein, in each cross-section taken in a plane transverse to the cage axis over a majority of the cage length, the plurality of struts define a triangle comprising a top vertex and a pair of bottom vertices opposite the top vertex; and a filter bag comprising filter media defining an interior volume of the filter bag, wherein the filter bag extends from a first end to a second end, wherein a portion of the filter media defines a bag opening at the first end of the filter bag; wherein the bag opening is attached to the flange assembly, wherein the bag opening and the flange assembly form a seal around the clean air outlet such that air entering the interior volume of the filter bag must pass through the filter media of the filter bag or through the clean air outlet of the flange assembly; wherein, when the cage is located in the filter bag, the filter media of the filter bag defines a pair of side surfaces and a bottom surface, wherein each side surface of the pair of side surfaces comprises a top edge proximate the top vertex of each triangle defined by the plurality of struts, and wherein each side surface of the pair of side surfaces comprises a bottom edge distal from the top edge, wherein the bottom edges of the side surfaces are proximate the bottom vertices of each triangle defined by the plurality of struts, and wherein the bottom surface of the filter media extends between the bottom edges of the side surfaces.

In a third aspect, one or more embodiments of an air filter system described herein may include: a tubesheet separating a housing into a dirty air chamber and a clean air chamber, wherein the tubesheet comprises an aperture placing the dirty air chamber in fluid communication with the clean air chamber, and wherein the housing comprises an access panel located across the dirty air chamber from the tubesheet; a filter guide in the dirty air chamber, the filter guide extending along a guide axis passing through the tubesheet and the access panel. The system includes a filter bag assembly mounted on the filter guide and located in the dirty air chamber, the filter bag assembly comprising: a flange assembly comprising an interior face and a tubesheet face facing the tubesheet, the flange assembly surrounding the aperture in the tubesheet and comprising a clean air outlet extending through the flange assembly, the clean air outlet in fluid communication with the aperture in the tubesheet, wherein the clean air outlet comprises an elongated shape extending from a top end to a bottom end, wherein an outlet axis extends between the top end and the bottom end of the clean air outlet; a cage comprising a first cage end attached to the flange assembly and extending over a cage length to a second cage end distal from the flange assembly, the cage defining a cage axis extending between the first cage end and the second cage end, the cage further comprising a plurality of struts extending away from the interior face of the flange assembly towards the second cage end, wherein, in each cross-section taken in a plane transverse to the cage axis over a majority of the cage length, the plurality of struts define a triangle comprising a top vertex and a pair of bottom vertices opposite the top vertex; and a filter bag comprising filter media defining an interior volume of the filter bag, wherein the filter bag extends from a first end to a second end, wherein a portion of the filter media defines a bag opening at the first end of the filter bag; wherein the bag opening is attached to flange assembly, wherein the bag opening and the flange assembly form a seal around the clean air outlet such that air entering the interior volume of the filter bag must pass through the filter media of the filter bag or through the clean air outlet of the flange assembly; wherein, when the cage is located in the filter bag, the filter media of the filter bag defines a pair of side surfaces and a bottom surface, wherein each side surface of the pair of side surfaces comprises a top edge proximate the top vertex of each triangle defined by the plurality of struts, and wherein each side surface of the pair of side surfaces comprises a bottom edge distal from the top edge, wherein the bottom edges of the side surfaces are proximate the bottom vertices of each triangle defined by the plurality of struts, and wherein the bottom surface of the filter media extends between the bottom edges of the side surfaces; a filter access port in the access panel of the housing, the filter access port comprising a cover movable between a closed position and an open position, wherein the cover closes the filter access port when the cover is in the closed position and wherein the filter bag assembly can be inserted into or removed from the dirty air chamber when the cover is in the open position, wherein, optionally, the cover acts on and forces the tubesheet face of the flange assembly against the tubesheet when the filter bag assembly is mounted on the filter guide and the cover is in the closed position; and a pulse generator located in the clean air chamber and configured to deliver pulses of air into the interior volume of the filter bag through the aperture in the tubesheet and the clean air outlet of the flange assembly, the pulses of air passing through the aperture and the clean air outlet before reaching the interior volume of the filter bag.

In a fourth aspect, one or more embodiments of an air filter system as described herein may include: a tubesheet separating a housing into a dirty air chamber and a clean air chamber, wherein the tubesheet comprises an aperture placing the dirty air chamber in fluid communication with the clean air chamber, and wherein the housing comprises an access panel located across the dirty air chamber from the tubesheet; a filter bag assembly located in the dirty air chamber, the filter bag assembly comprising a flange assembly covering the aperture in the tube sheet, a cage comprising a first end attached to the flange assembly, the cage extending away from the flange assembly to a second end proximate the access panel, and a filter bag comprising a bag opening sealed within the flange assembly, wherein the cage is located in an interior volume of the filter bag with the second end of the cage proximate a closed end of the filter bag; an access port in the access panel proximate the second end of the cage, wherein the filter bag assembly passes through the access port during placement in and removal from the dirty air chamber; and means for forcing the flange assembly against the tubesheet by applying a compression force on the second end of the cage, wherein the compression force acts on the second end of the cage through the filter bag.

In a fifth aspect, one or more embodiments of a method of sealing a filter bag over an aperture in a tubesheet of an air filter system as described herein may include: positioning a filter bag assembly in a dirty air chamber of an air filter system with a flange assembly of the filter bag assembly located proximate the tubesheet, wherein a bag opening of a filter bag of the filter bag assembly is located over the aperture in the tubesheet, and wherein the flange assembly covers the aperture; and forcing the flange assembly against the tubesheet by applying a compression force on a cage located in an interior volume of the filter bag, wherein the cage is attached to the flange assembly and extends away from the flange assembly towards a closed end of the filter bag; wherein air passing through the aperture in the tubesheet from the dirty air chamber must pass through the filter bag before reaching the aperture.

In a sixth aspect, one or more embodiments may involve use of a triangular filter bag in an air filter system comprising an array of two or more of the triangular filter bags arranged generally horizontally within a dirty air chamber, wherein a bottom surface of each triangular filter bag is oriented in a generally horizontal position.

In a seventh aspect, one or more embodiments of a triangular filter bag as described herein may include an opening, a closed end, a body extending from the opening to the closed end along a bag axis extending between the opening to the closed end, and a substantially triangular end cap attached to the body at the closed end; wherein the body comprises filter media taking a tubular shape that defines an interior volume between the opening and the closed end, wherein the filter media comprises a closed end edge at the closed end of the bag and an opening edge at the opening of the bag; wherein the triangular end cap comprises a bottom edge and two side edges extending away from the bottom edge, wherein the side edges meet at an apex of the triangular end cap that is distal from the bottom edge; and wherein the filter media at the closed end edge of the body is sealed to the bottom edge, the apex, and the two side edges of the triangular end cap.

In an eighth aspect, one or more embodiments of a filter bag as described herein may include an opening, a closed end, a body extending from the opening to the closed end along a bag axis extending between the opening to the closed end, wherein the body comprises filter media taking a tubular shape that defines an interior volume between the opening and the closed end, and wherein the filter bag comprises a bag support connector attached to an exterior of the body proximate the closed end.

Use of any of the air filter systems, filter bag assemblies, and filter described herein to remove particulate matter from dirty air is also described herein.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements.

It is noted that the term "comprises" and variations thereof do not have a limiting meaning where these terms appear in the accompanying description. Moreover, "a," "an," "the," "at least one," and "one or more" are used interchangeably herein.

The above summary is not intended to describe each embodiment or every implementation of the air filter systems and methods described herein. Rather, a more complete understanding of the invention will become apparent and appreciated by reference to the following Description of Illustrative Embodiments and claims in view of the accompanying figures of the drawing.

BRIEF DESCRIPTIONS OF THE VIEWS OF THE DRAWING

FIG. 9A is a left side perspective view of one illustrative embodiment a flange assembly and cage used in one illustrative embodiment of a filter bag assembly as described herein.

DESCRIPTION OF ILLUSTRATIVE EMBODIMENTS

Figure 1:
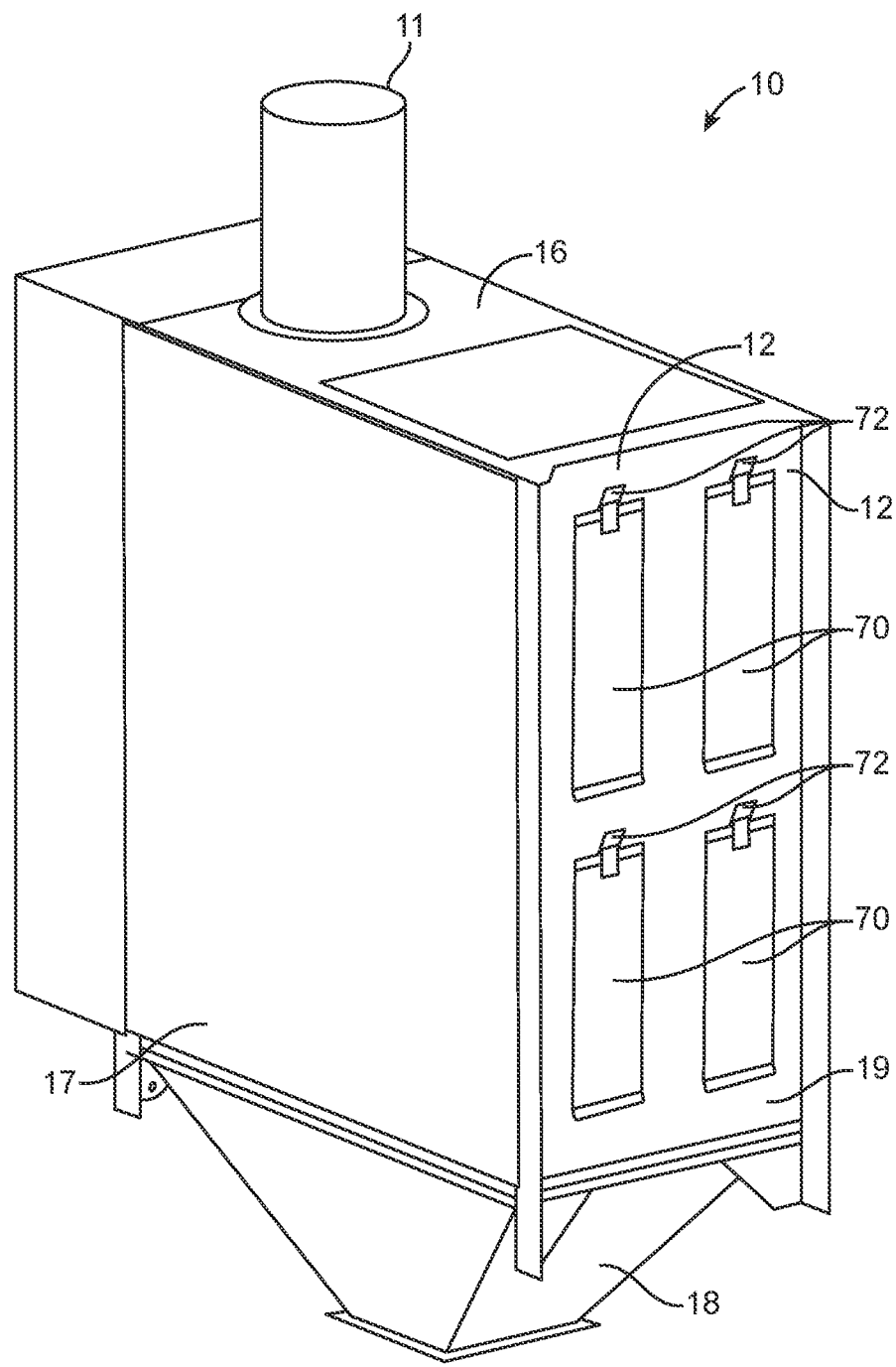
FIG. 1 is a perspective view of one illustrative embodiment of an air filter system as described herein.

In the following description of illustrative embodiments, reference is made to the accompanying figures of the drawing which form a part hereof, and in which are shown, by way of illustration, specific embodiments. It is to be understood that other embodiments may be used and structural changes may be made without departing from the scope of the present invention.

Figure 2:
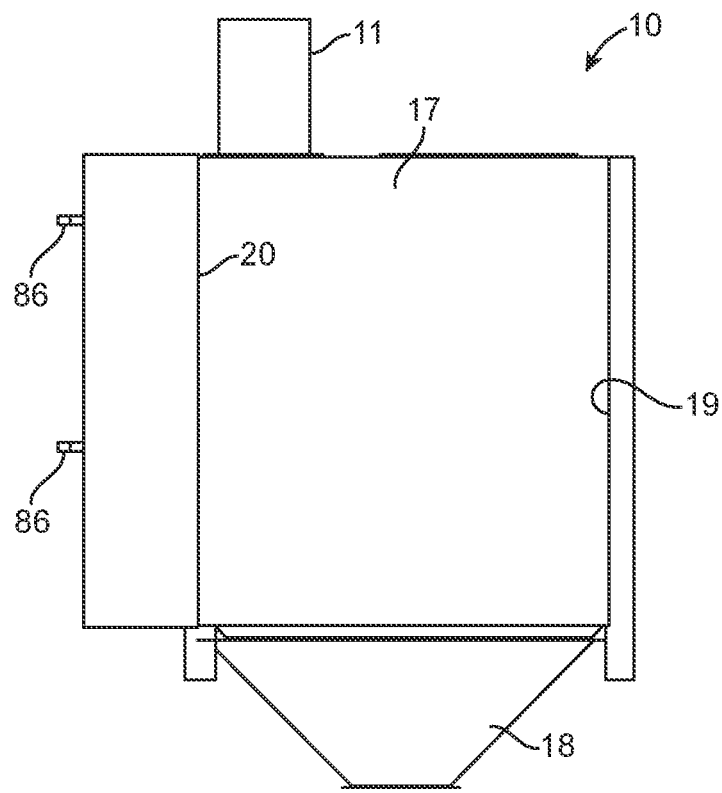
FIG. 2 is a side view of the air filter system depicted in FIG. 1.
Figure 3:
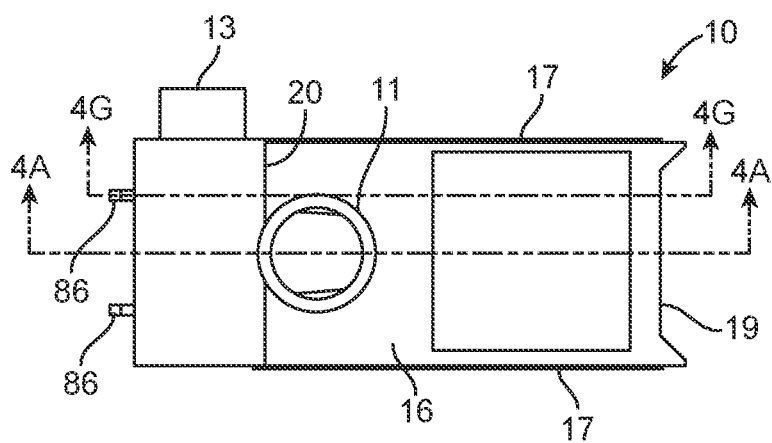
FIG. 3 is a top view of the air filter system depicted in FIGS. 1 and 2.

Referring to FIGS. 1-3, one illustrative embodiment of an air filter system is depicted generally at 10. The air filter system depicted in FIG. 1 is generally in the shape of a box and includes an upper wall panel 16, and two pairs of opposite side wall panels 17 (one of which is visible in FIG. 1). The air filter system 10 includes a dirty air conduit 11 for receiving dirty or contaminated air (i.e., air with particulate matter therein) into the filter system 10. A clean air conduit 13 (see, e.g., FIG. 3) may be provided for removing clean or filtered air from the filter system 10. The air filter system 10 includes covers 70 closing access ports in the access panel 19 of the air filter system 10.

The air filter system may also include a hopper 18 to collect particulate matter separated from the dirty air stream as described herein. The hopper 18 may include sloped walls to facilitate collection of the particulate matter and may, in some embodiments, include a driven auger or other mechanism for removing the collected particulate matter.

The air filter system of FIG. 1 is depicted in a side elevation in FIG. 2 and a top plan view in FIG. 3. The air filter system 10, as seen in FIGS. 2 and 3, includes connectors 86 in fluid communication with pulse generators (not depicted in FIGS. 1-3) as part of a pulse-jet cleaning system, with the pulse generators configured to direct a pulse of air into the filter bags as described herein.

Figure 4A:
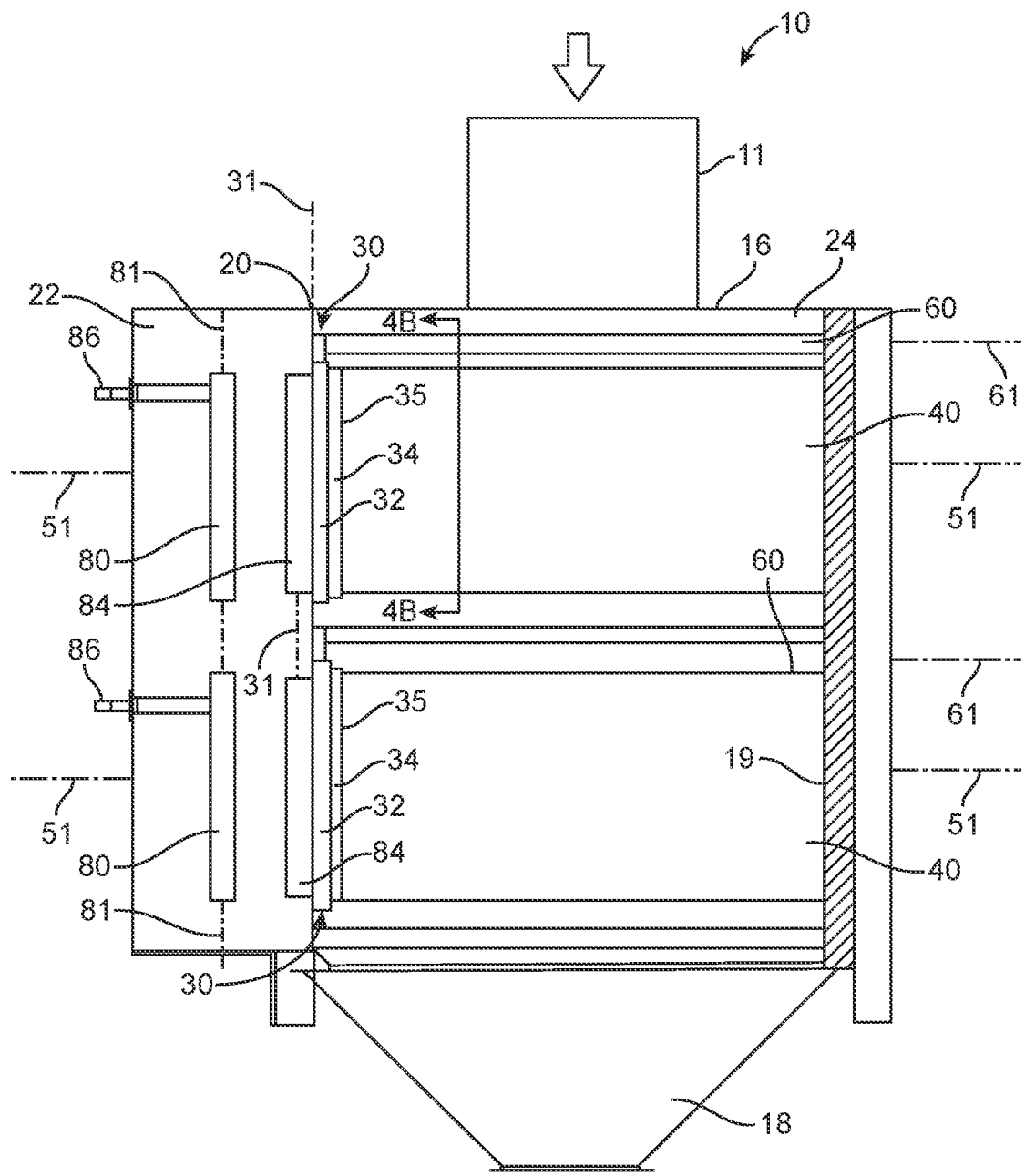
FIG. 4A is a cross-sectional view of the air filter system of FIGS. 1-3 taken along line 4A-4A in FIG. 3.
Figure 4B:
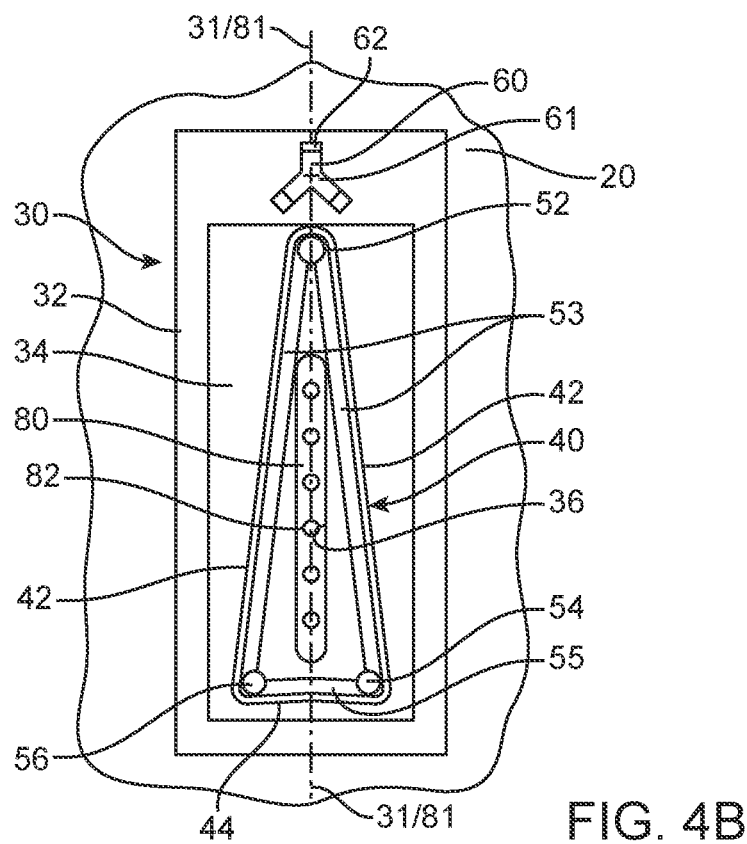
FIG. 4B is a cross-sectional view of the air filter system of FIG. 3 taken along line 4B-4B in FIG. 3 when the system is out of service.
Figure 4C:
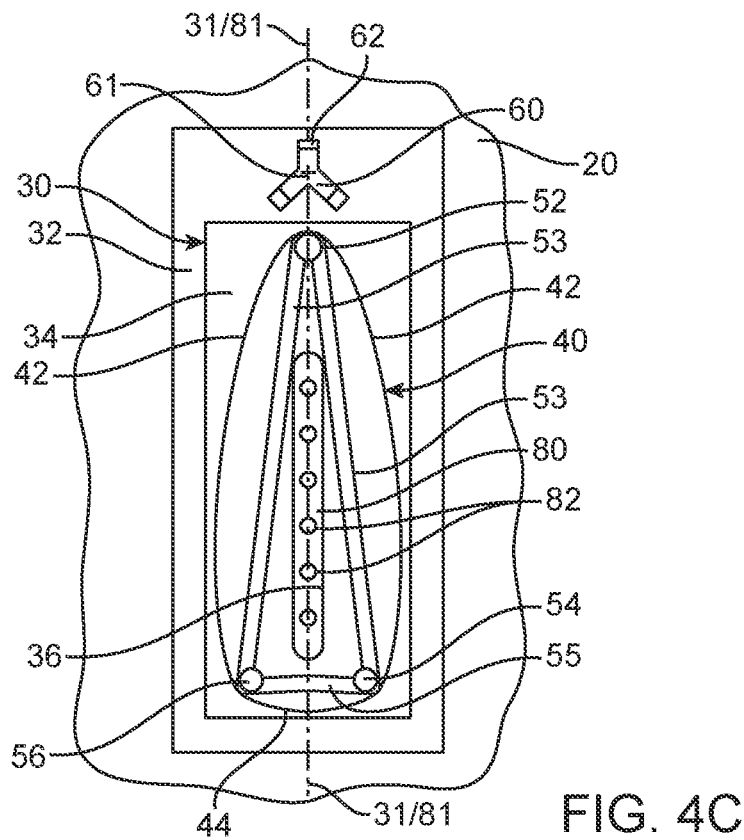
FIG. 4C is a cross-sectional view of the air filter system of FIG. 3 taken along line 4B-4B in FIG. 3 during a pulse cleaning event.
Figure 4D:
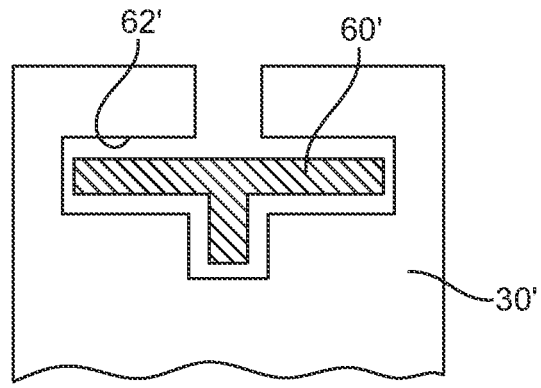
FIGS. 4D-4F depict some alternative embodiments of filter guides and corresponding guide apertures that may be provided in one or more embodiments of air filter systems as described herein.
Figure 4E:
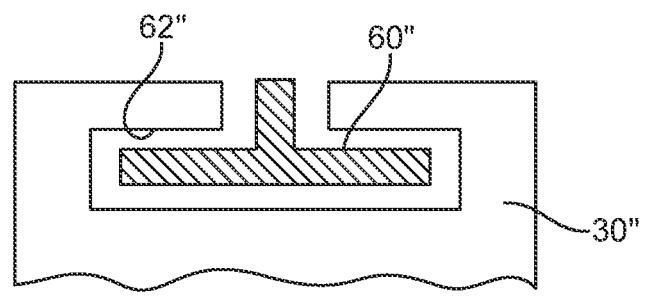
Figure 4F:
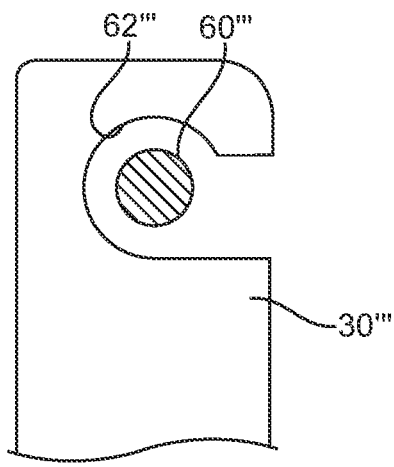
Figure 4G:
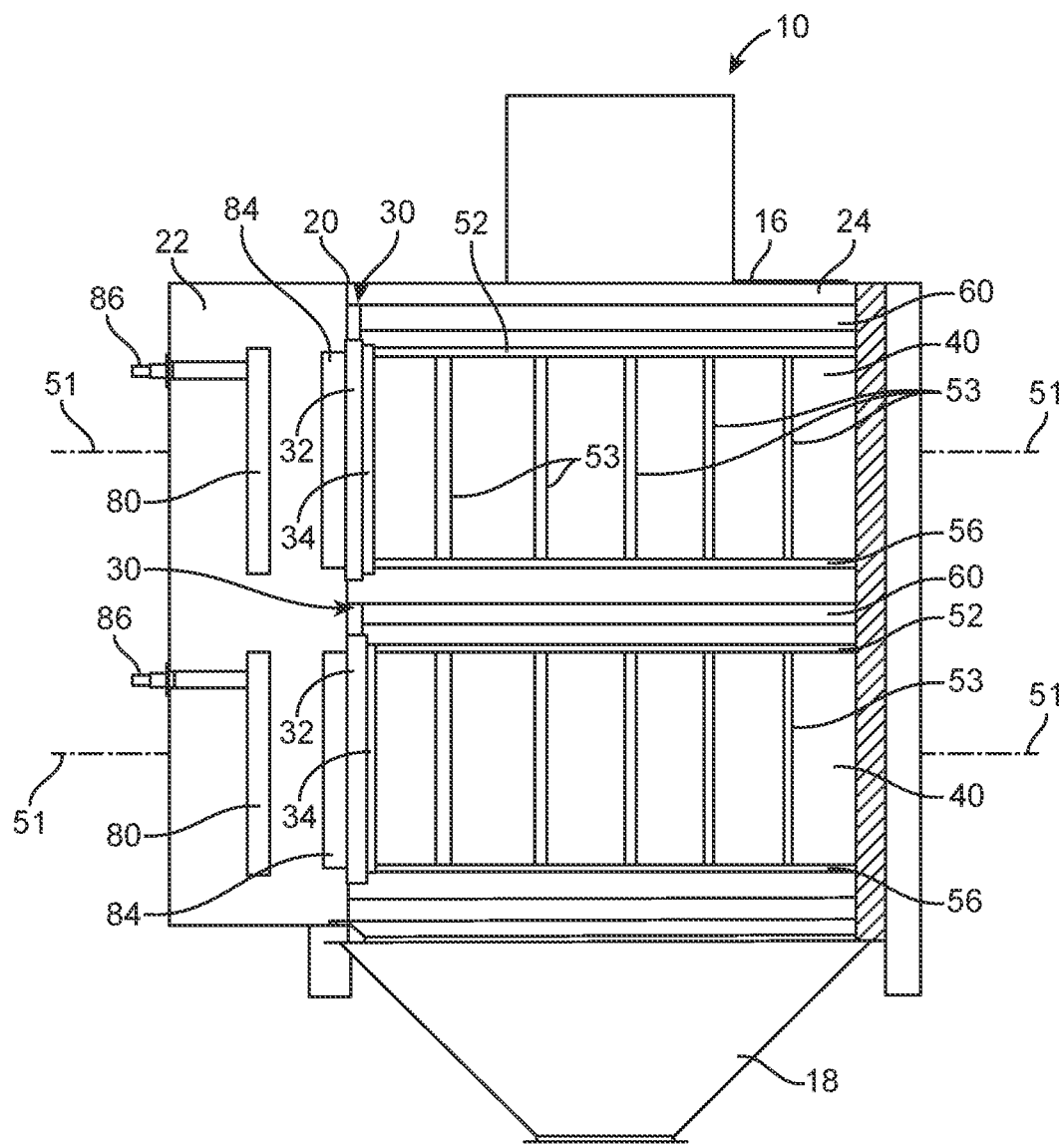
FIG. 4G is a cross-sectional view of the air filter system of FIGS. 1-3 taken along line 4G-4G in FIG. 3.

With reference to FIGS. 4A and 4G, the depicted air filter system 10 includes filter bag assemblies including filter bags 40 and flange assemblies 30 in a dirty air chamber 24 that is separated from a clean air chamber 22 by a tubesheet 20. FIG. 4A is a cross-sectional view of the air filter system 10 taken along line 4A-4A in FIG. 3 and shows the interior of the air filter system 10 (with the filter bags 40 located therein being intact such that the support structure within the filter bags 40 is obscured from view). FIG. 4G is a cross-sectional view of the air filter system 10 taken along line 4G-4G in FIG. 3 (with the cross-sectional view depicting the interior volume of the filter bags 40 such that a portion of the support structure within the filter bags 40 is depicted). The filter bag assemblies are mounted on filter guides 60 located in the dirty air chamber 24. In the depicted illustrative embodiment, the filter guides 60 extend across the dirty air chamber 24 from the tubesheet 20 to the access panel 19 of the air filter system.

The filter bags used in the air filter systems described herein may be constructed of any suitable filter media in view of the particulate matter to be collected, airflow requirements, strength requirements, etc. Suitable filter bags may be constructed of filter media that includes one or more of polyester, polypropylene, aramid, polyester/polytetrafluoroethylene material in both woven and/or nonwoven constructions, etc.

In one or more embodiments, the filter bags used in the filter bag assemblies described herein may be distinguished from filter cartridges based on their response to compression forces directed between the filter bag opening and the second end of the filter bag, i.e., the end of the bag located opposite the bag opening. In the absence of any extraneous support (such as, e.g., the internal cages described herein), filter bags used in the filter bag assemblies described herein would, in one or more embodiments, deform under a compressive force of 5 Newtons (approx. 1.1 pound-force) directed along a line extending through the bag opening to the distal/closed end of the filter bag (e.g., along the cage axis 51 depicted in FIG. 4A). In addition to deforming, one or more embodiments of the filter bags used in the filter bag assemblies described herein, transmit essentially none of such a compressive force. A filter cartridge would, in contrast, not significantly deform and would transmit most, if not all, of such a compressive force. The flexibility that is the source of the inability of the filter bags used in the filter bag assemblies and air filter systems described herein to transmit compressive forces is, however, the source of the filter bags' ability to rapidly accelerate (sometimes referred to as "snap") outward to remove particulate matter collected on the exterior of the filter media in response to a cleaning pulse.

At the tubesheet end, each of the filter bag assemblies includes a flange assembly 30. The flange assembly 30 includes an interior face 35 facing the dirty air chamber 24 and a tubesheet face that seals against the dirty air chamber side of the tubesheet 20. Each of the flange assemblies 30 surrounds an aperture in the tubesheet 20 through which clean air can pass from the interior of a filter bag assembly into the clean air chamber and through which a pulse of air can pass into the interior of a filter bag during a pulse cleaning event.

Although the flange assemblies 30 on each of the filter bag assemblies will be described in more detail herein, the depicted illustrative embodiment of flange assemblies 30 seen in FIG. 4A includes a base 32 including the tubesheet face of the flange assembly 30 and a clamp 34 configured to attach to the base 32 on the interior face of the flange assembly 30. In such an embodiment, the clean air outlet extends through the base 32 and the clamp 34, with the bag opening of the filter bag 40 being retained between the clamp 34 and the base 32 on the interior face of the flange assembly 30.

The illustrative embodiment of air filter system 10 as depicted in FIG. 4A also includes pulse generators 80 located in the clean air chamber 22. The pulse generators 80 are configured to deliver pulses of air into the interior volumes of the filter bags 40 to drive particulate matter that has accumulated on the filter bags 40 during use of the filter bags, with the dislodged particulate matter preferably falling into the hopper 18 located below the filter bags 40. In one or more embodiments, the pulse generators 80 may be described as having elongated shapes that extend along pulse generator axes 81 as seen in, e.g., FIG. 4A. Pressurized air (or any other suitable gas) is delivered to the pulse generators through connectors 86 that, in the depicted embodiment, extend outside of the clean air chamber 22 for connection to a pulse cleaning system including one or more sources of pressurized gas (e.g., air), valves and a control system. Illustrative embodiments of pulse cleaning systems may be found in, e.g., U.S. Pat. No. 4,218,227 (Frey), U.S. Pat. No. 5,562,746 (Raether), U.S. Pat. No. 6,090,173 (Johnson et al.), U.S. Pat. No. 6,902,592 (Green et al.), U.S. Pat. No. 7,641,708 (Kosmider et al.), and U.S. Pat. No. 8,075,648 (Raether).

Also depicted in connection with the illustrative embodiment of air filter system 10 are pulse collectors 84 which, as will be described herein, may be attached to the flange assemblies 30 of the filter bag assemblies. In other embodiments, the pulse collectors 84 may be attached to the tubesheet 20. Regardless of the structure to which they are attached, the pulse collectors 84 are configured to direct pulsed air emitted from the pulse generators 80 into the interior volumes of the filter bags 40 during the pulse cleaning process.

FIGS. 4B and 4C are cross-sectional views taken along line 4B-4B in FIG. 4A, with FIG. 4B being taken when the air filter system 10 is either not in use or is being used to filter dirty air being delivered into the dirty air chamber 24 through inlet 11. FIG. 4C depicts the filter bag 40 relative to the other structures of the filter bag assembly during a pulse cleaning event when pressurized air (or other gas) is delivered into the interior volume of the filter bag 40 as described herein.

FIG. 4B depicts a portion of the dirty air chamber side of the tubesheet 20 with flange assembly 30 located thereon. As discussed herein, the depicted illustrative embodiment of flange assembly 30 includes a base 32 and a clamp 34, with the bag opening of the filter bag 40 being retained between the clamp 34 and the base 32 such that air can enter the interior volume of filter bag 40 only by passing through the filter media used to construct filter bag 40 or by passing through the clean air outlet 36 of the flange assembly 30.

The filter bag assembly as seen in FIGS. 4B and 4C includes a cage used to hold the filter bag 40 in a triangular shape (with the cage being seen in the cross-sectional view of FIG. 4G). In the depicted illustrative embodiment, the cage includes a first cage end attached to the flange assembly 30, with the cage extending away from the flange assembly 30 over a cage length along a cage axis 51 to a second cage end distal from the flange assembly 30. In the depicted illustrative embodiment, the second cage is located proximate the access panel 19 of the air filter system 10.

In the depicted illustrative embodiment of the filter bag assembly, the cage includes a plurality of struts that extend away from the interior face of the flange assembly 30 towards the second cage end proximate the access panel 19 of the air filter system 10. The plurality of struts define a triangular shape such that, in each cross-section taken in a plane transverse to the cage axis 51 over a majority of the length of the cage, the plurality of struts define a triangle having a top vertex and a pair of bottom vertices opposite the top vertex.

In the depicted illustrative embodiment, the cage includes a top strut 52 and a pair of bottom struts 54 and 56. The top strut 52 defines a top vertex of the triangles defined by the plurality of struts, while the pair of bottom struts 54 and 56 defined the bottom vertices of the triangles defined by the plurality of struts. The depicted illustrative embodiment of the cage also includes a series of braces 53 extending from the top strut 52 to each of the bottom struts 54 and 56 to provide additional support to the filter bag 40 at selected locations along the length of the cage.

When the cage is located in the filter bag 40, the filter media of the filter bag 40 may be described as defining a pair of side surfaces 42 and a bottom surface 44. Each of the side surfaces 42 includes a top edge proximate the top vertex (as defined by the top strut 52) of each triangle defined by the plurality of struts. Moreover, each side surface 42 also includes a bottom edge distal from the top edge of the side surface 42. With reference to FIG. 4B, the bottom edge of the right side surface 42 is defined by the right side bottom vertex (as defined by bottom strut 54) of each triangle defined by the plurality of struts, while the bottom edge of the left side surface 42 is defined by the left side bottom vertex (as defined by bottom strut 56) of each triangle defined by the plurality of struts.

Because the filter bags used in the filter bag assemblies of air filter systems as described herein are made of generally flexible filter media, the top edges and bottom edges of the triangular-shaped filter bags may not be particularly distinct, i.e., the edges may not form a single line. It will, however, be understood that the edges may have a width around which the filter media extends when moving from the side surfaces 42 to the bottom surface 44 around the bottom struts 54 and 56 and/or when moving from one side surface 42 to the opposite side surface over the top strut 52. Regardless of that lack of distinctiveness, the edges will be understood as conforming generally to the shape of the struts used to define the different vertices of the triangles.

The triangular shapes defined by the plurality of struts in the illustrative embodiment of the cage as seen in FIGS. 4B and 4C are only one example of the triangular shapes that may be used in connection with filter bag assemblies and air filter systems as described herein. In general, however, one or more embodiments of the filter bag assemblies described herein may be described as having a bottom surface 44 of filter media having a width measured between the bottom edges of the side surfaces 42 (as defined by the bottom struts 54 and 56) that is less than a height of either of the side surfaces 42 as measured between their top edges and bottom edges (where the top edges are defined by the top strut 52 and the bottom edges are defined by the bottom struts 54 and 56). In one or more embodiments, the width of the bottom surface 44 may be 50% or less, 40% or less, 30% or less, 20% or less, 15% or less, 12% or less, 10% or less, 8% or less, or 5% or less of the height of either side surface 42 of the pair of side surfaces. At a lower end, the width of the bottom surface may be 4% or more, 5% or more, 6% or more, 8% or more, 10% or more, 12% or more, 15% or more of the height of either side surface of the pair of side surfaces. The width and height as discussed herein are measured transverse to the cage axis 51, i.e., as seen in, e.g., FIG. 4B.

Other features depicted in the cross-sectional views of FIGS. 4B and 4C include filter guide 60 which, in the depicted illustrative embodiment, extends from the tubesheet 20 to the access panel 19 of the dirty air chamber 24. In the depicted illustrative embodiment, the filter guide 60 defines a guide axis 61 passing through the tubesheet 20 and the access panel 19. The depicted guide axis 61 is aligned with the cage axis 51 and, although, the two axes 51 and 61 may be parallel with each other, a perfectly parallel arrangement is not required.

Filter guide 60 includes an entry end 63 at which the guide aperture 62 on the flange assembly 30 can be threaded, guided, or otherwise directed onto the filter guide 60 so that the flange assembly 30 can be supported on the filter guide 60. In one or more embodiments, the entry end 63 of the filter guide 60 may be located closer to the access panel 19 of the air filter system than the tubesheet 20 against which the flange assembly 30 is forced as described herein.

Although the filter guide 60 extends from the tube sheet 20 to the access panel 19 in some of the depicted illustrative embodiments described herein, in one or more alternative embodiments, the filter guide 60 may only extend partially across the dirty air chamber such that, e.g., the filter guide 60 may terminate at a location short of the access panel 19 or even short of the tube sheet 20. In one alternative embodiment, for example, the filter guide 60 may extend from the tubesheet 20 towards the access panel 19 but terminate short of the access panel 19.

The filter guide 60 is located within a guide aperture 62 formed in the flange assembly 30. The combination of the filter guide 60 and the guide aperture 62 formed in the flange assembly 30 provides support to the flange assembly 30 during insertion and removal of a filter bag assembly from the dirty air chamber 24 of the air filter system 10. In particular, it may be preferred that the filter guide 60 and guide aperture 62 allow for translational or sliding movement of the flange assembly 30 through an access port in the access panel 19 to the tubesheet 20. Although the depicted filter guide 60 and guide aperture 62 in the flange assembly 30 have similar shapes, any suitable combination of shapes for both the filter guide and the guide aperture may be used.

Some alternative embodiments of filter guides and guide apertures are depicted in FIGS. 4D-4F. In FIG. 4D, the filter guide 60' has a T-shaped profile and the guide aperture 62' in flange assembly 30' has a complementary shape configured to accept the filter guide 60'. In FIG. 4E, the filter guide 60" has an inverted T-shaped profile and the guide aperture 62" in flange assembly 30" has a complementary shape configured to accept the filter guide 60". In FIG. 4F, the filter guide 60''' has a round profile and the guide aperture 62''' in flange assembly 30''' has a complementary shape configured to accept the filter guide 60'''. Many other alternative shapes for filter guides and guide apertures could also be provided.

In addition to providing support to the flange assembly 30 in a vertical direction, the combination of filter guide 60 and guide aperture 62 may, in one or more embodiments, also serve to limit or prevent rotation of the flange assembly around the guide axis 61 so that proper alignment of the flange assembly 30 on the tubesheet 20 may be achieved. To limit or prevent such rotation, the filter guide 60 and guide aperture 62 on the flange assembly 30 may have a noncircular shapes, with the tri-lobed and T-shaped examples of the depicted illustrative embodiments providing examples of only some noncircular shapes that may limit or prevent rotation of the flange assembly 30 relative to the guide axis 61.

In one or more embodiments, the filter guide 60 may include a dust cover to prevent accumulation of particulate matter on the filter guide 60 that could be dislodged during removal of the filter bag assembly (e.g., as the flange assembly 30 moves from the tubesheet 20 towards the access panel 19).

Other features depicted in the cross-sectional views of FIGS. 4B and 4C include the clean air outlet 36 provided in the flange assembly 30 which allows both clean air to exit the interior volume of the filter bags 40 and also allows for pulses of air or other gases to enter the interior volume during a pulse cleaning process. In one or more embodiments, the clean air outlet may be described as having an elongated shape that extends from a top end (closest to the top strut 52) and a bottom end (closest to the bottom struts 54 and 56). The top end and the bottom end of the clean air outlet 36 may further be described as defining an outlet axis 31 that extends between the top and bottom ends of the clean air outlet 36. In one or more embodiments, a projection of the outlet axis 31 along the cage axis 51 passes between the pair of bottom vertices of the triangles defined by the plurality of struts (where those bottom vertices are defined by the bottom struts 54 and 56). Further, the projection of the outlet axis 31 passes through the top vertex (as defined by the top strut 52) of the triangles defined by the plurality of struts.

Although not depicted in FIGS. 4B and 4C, will be understood that tubesheet 20 includes a tubesheet aperture formed therethrough that is at least as large as the clean air outlet 36 provided in the flange assembly 30 such that the tubesheet aperture does not restrict airflow through the clean air outlet 36 into or out of the interior volume of the filter bag 40. Furthermore, the tubesheet aperture may also be described as having a size that is smaller than the flange assembly 30 such that the flange assembly 30 can close or seal the tubesheet aperture such that air passing between the clean air chamber 22 and dirty air chamber 24 must pass through a clean air outlet 36 when the air filter system 10 is operational.

The cross-sectional views of FIGS. 4B and 4C also depicts the alignment between pulse generators 80 and the clean air outlet 36 of the flange assemblies 30 in the depicted illustrative embodiment of air filter system 10. In particular, the pulse generators 80 may be aligned with the clean air outlet 36. Even more particularly, the pulse generator axis 81 may be aligned with the outlet axis 31 when viewed along the cage axis 51 as seen in FIGS. 4B and 4C.

The views of FIGS. 4B and 4C further depict the ports 82 of pulse generator 80. In particular, the ports 80 to face the clean air outlet 36 and the aperture in the tubesheet 20. Air delivered through the ports 82 of the pulse generator 80 passes through those ports and into the clean air outlet 36 formed in flange assembly 30.

Because the filter bags used in air filter systems as described herein have generally triangular shapes, various features may be incorporated into the ports 82 of the pulse generators 82 facilitate the pulse cleaning process. For example, in one or more embodiments, the ports 82 closer to the bottom end of the clean air outlet 36 (i.e., closer to the bottom 44 of the filter bag 40) may be larger in size than ports 82 located closer to the top end of the clean air outlet 36 (i.e., closer to the top edges of the sides 42 of the filter bag 40). Alternatively, or in addition, the spacing between ports 82 may vary along the pulse generator axis 81. For example, the spacing between the ports 82 located closer to the bottom end of the clean air outlet 36 may be smaller than the spacing between the ports 82 located closer to the top end of the clean air outlet 36. Such variations in size and/or spacing of the ports 82 may facilitate the pulse cleaning process by providing more air and or higher pressures within the filter bag 40 proximate the bottom surface 44.

A comparison of FIGS. 4B and 4C illustrates the beneficial effects of the triangular-shaped filter bags described herein with respect to particular loading and pulse cleaning. In particular, as seen in FIG. 4B the triangular shaped filter bag 40 includes a bottom surface 44 that faces downwardly away from the dirty air inlet 11 into dirty air chamber 24 (see, e.g., FIG. 4A). Particulate matter introduced into the dirty air chamber 24 above the triangular filter bag 40 does not, therefore, impinge directly on or, under the force of gravity alone, collect on the bottom surface 44 of the filter bag 40. This improves particulate loading performance of the filter bag 40.

Improvements in pulse cleaning performance are also provided by the triangular-shaped filter bag 40 because particulate matter that does collect on the bottom surface 44 of the filter bag 40 is directed downwardly away from the bottom surface 44 during pulse cleaning. With reference to FIG. 4C, the bottom surface 44 of the filter bag 40 is forced outwardly/downwardly during pulse cleaning. By virtue of the nature of pulse cleaning, that outward/downward movement of the bottom surface 44 is a result of rapid acceleration which imparts a force to any dislodged particulate matter released from the bottom surface 44, with the vector of that pulse cleaning force being generally aligned with the force of gravity to enhance movement of any dislodged particulate matter into a collection area such as, e.g., hopper 18 of air filter system 10.

In addition to the beneficial effects of the bottom surface 44 of the triangular-shaped filter bags 40 of air filter systems as described herein, the side surfaces 42 of the filter bags 40 are also rapidly accelerated outward during pulse cleaning as seen in the changed positions of the sides 42 of filter bag 40 between FIGS. 4B and 4C. As discussed herein, such movement of the sides 42 of the triangular-shaped filter bags 40 provides many of the same advantages in pulse cleaning performance associated with conventional envelope-shaped filter bags having vertical sides.

Figure 5:
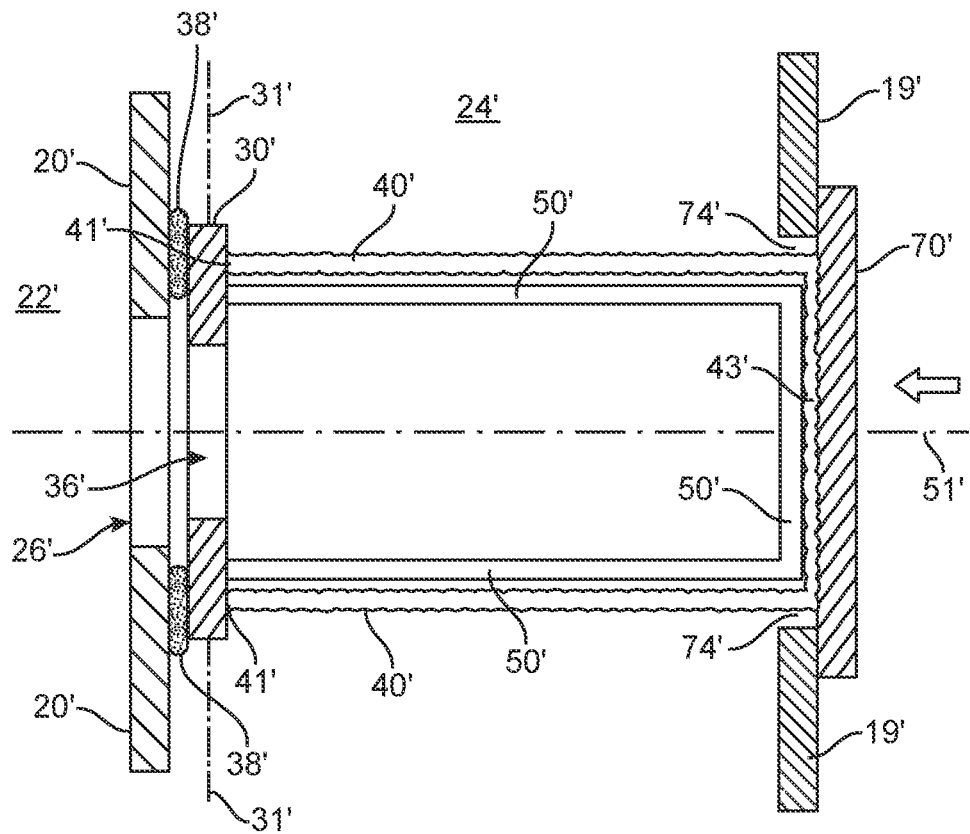
FIG. 5 is a schematic diagram of components of one illustrative embodiment of an air filter system as described herein illustrating the seal formed using a filter bag assembly as described herein.

FIG. 5 is a simplified schematic diagram of components of the illustrative embodiment of air filter system 10 depicting one illustrative embodiment of a seal formed using a filter bag assembly in an air filter as described herein. In the depicted illustrative embodiment, the filter bag assembly includes a flange assembly 30' and a cage 50' attached to the flange assembly 30'.

A filter bag 40' is attached to the filter bag assembly, with bag opening 41' being sealed against flange assembly 30' and the cage 50' located within the interior volume defined by the filter bag 40'. For reference, clean air outlet 36' extends along an outlet axis 31' in a manner similar to the outlet axis 31 depicted in, e.g., FIGS. 4A-4C.

Cage 50' defines a cage axis 51' that extends through clean air outlet 36' defined in flange assembly 30'. Cage 50' may also be described as including a first cage and attached to the flange assembly 30' and a second cage end distal from the flange assembly 30' along the cage axis 51'. The second cage end of the cage 50' may also be described as being proximate the second end 43' of the filter bag 40'.

Tubesheet 20' includes aperture 26' formed through the tubesheet 20'. Clean air chamber 22' and dirty air chamber 24' are also indicated in FIG. 5, with the two chambers being separated by the tubesheet 20'. Flange assembly 30' is positioned over the aperture 26' in tubesheet 20' such that air passing into and out of the interior volume of the filter bag 40' from the clean air chamber 22' passes through the aperture 26 ' and the clean air outlet 36' in the flange assembly 30'.

FIG. 5 also depicts the access panel 19' located opposite tubesheet 20' across the dirty air chamber 24'. Access port 74' is provided in access panel 19' to allow for removal and replacement of the filter bag assembly (including flange assembly 30', filter bag 40', and cage 50' attached to flange assembly 30' and located within the interior volume of the filter bag 40'). Access port 74' is closed by cover 70' to seal the dirty air chamber 24' during operation of the air filter system.

Also depicted in FIG. 5 is a seal 38' located between a tubesheet face of the flange assembly 30' and the tubesheet 20'. Seal 38' is located around aperture 26' in tubesheet 20' as well as being located around clean air outlet 36' in flange assembly 30'. Seal 38' ensures that air passing into the interior volume of the filter bag 40' must pass either through the filter media forming filter bag 40' (during, e.g., filtering) or the clean air outlet 36' and aperture 26' in tubesheet 20. In other words, the seal 38' between flange assembly 30' and tubesheet 20' prevents air (and preferably any particulate matter) from passing between the tubesheet face of the flange assembly 30' and the tubesheet 20' during operation of an air filter system as described herein.

In one or more embodiments, seal 38' may be formed by compression between the flange assembly 30' and the tubesheet 20'. In one or more embodiments, a seal actuator may be provided to apply a seal force on the cage 50' of the filter bag assembly. In such embodiments, the seal force is preferably directed along the cage axis 51 towards the tubesheet 20'. In one or more embodiments, the seal force may be described as being directed through the second end 43' of the filter bag 40' and further being transferred to the seal 38' through the filter bag 40', cage 50', and flange assembly 30'. In particular, the cover 70', which functions as the seal actuator in the depicted illustrative embodiment, acts on the second end 43' of the filter bag 40' which, in turn, acts on the second cage end of the cage 50', with the cage 50' transferring that force to the flange assembly 30' by virtue of its attachment to the flange assembly 30'.

Seal 38' may be constructed of any suitable material and/or structures. Although many seals may be formed by compression of one or more resilient and/or elastomeric materials (in, e.g., O-rings, gaskets, etc.), other seal constructions may also be used to form the required seal between the flange assembly and the tubesheet in air filter systems as described herein when the flange assembly is subjected to a compression force (e.g., knife edge seals, radial seals, axial seals, etc.).

Figure 6A:
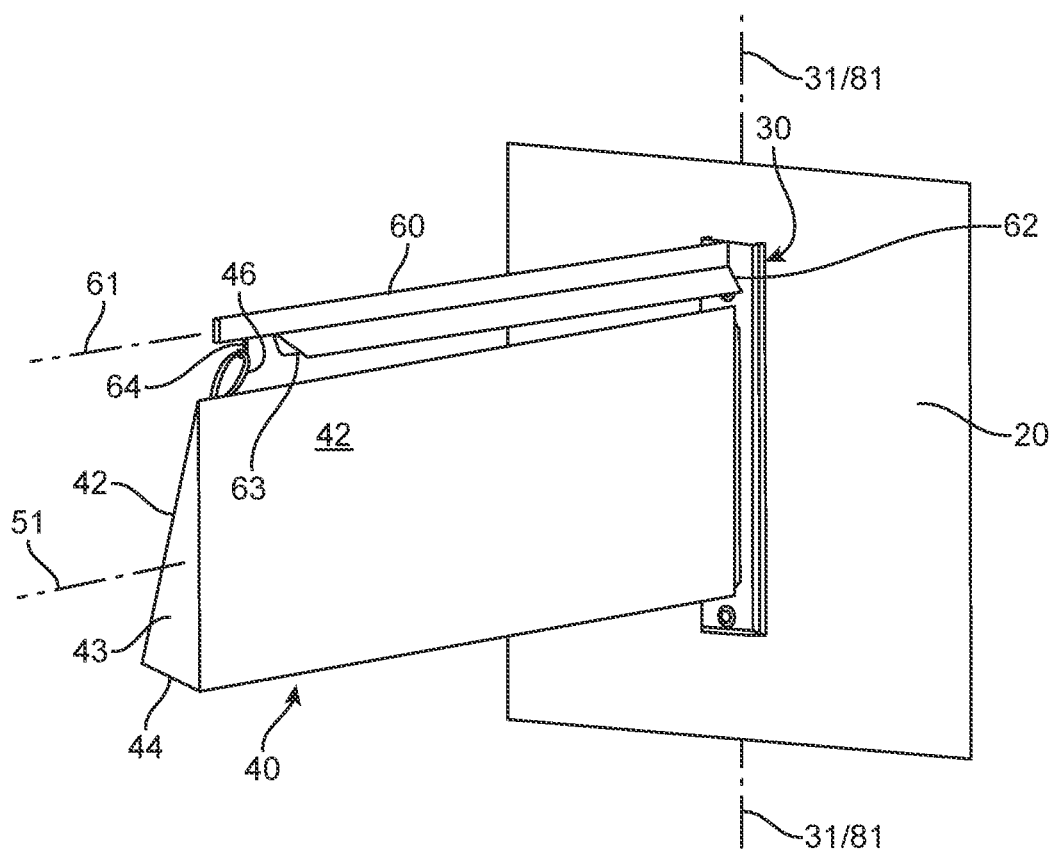
FIG. 6A is a perspective view of a portion of a tubesheet, with one illustrative embodiment of a filter bag assembly supported on one illustrative embodiment of a filter guide as described herein.

FIG. 6A is a perspective view of a portion of the tubesheet 20, with the illustrative embodiment of a filter bag assembly including a filter bag 40 supported on the illustrative embodiment of filter guide 60. As discussed herein, the filter bag assembly, including flange assembly 30 and filter bag 40 are supported on the filter guide 60, with the flange assembly 30 forming a seal with the tubesheet 20.

In one or more embodiments of the filter bags and air filter systems described herein, a bag support may be provided proximate the second end of the filter bag, i.e., the end of the filter bag distal from the flange assembly, with the bag support configured to prevent or limit sagging of the filter bag assembly at the second end of the filter bag due to, e.g., the weight of the cage located in the filter bag. In one or more embodiments of the filter bags, filter bag assemblies, and/or air filter systems described herein, the bag support may be provided on filter bag itself, as a part of the air filter system, and/or include components provided as a part of the filter bag and as a part of the air filter system.

The filter bag assembly depicted in FIG. 6A includes one illustrative embodiment of a bag support in the form of a bag support connector 46 attached to the filter bag 40 proximate the second end 43 of the filter bag 40 and a chamber connector 64 that is positioned in the dirty air chamber proximate the access panel 19 of the housing. In the depicted embodiment the chamber connector 64 is located on the filter guide 60 although such positioning is not required. The bag support connector 46 and the chamber connector 64 are configured to interlock with each other to support the second end of the filter bag 40 in the dirty air chamber (with the first end of the filter bag 40 being supported by the flange assembly 30 in cooperation with the filter guide 60 as described herein).

In the embodiment of a bag support as depicted in FIG. 6A, the bag support connector 46 is in the form of a loop while the chamber connector 64 is in the form of a hook, with the loop 46 connecting to the hook 64 to support the second end 43 of the filter bag 40. Many variations are, of course possible. For example, the bag support connector 46 on the filter bag 40 may be in the form of a hook while the chamber connector 64 is in the form of a loop or aperture configured to receive the hook.

Figure 6B:
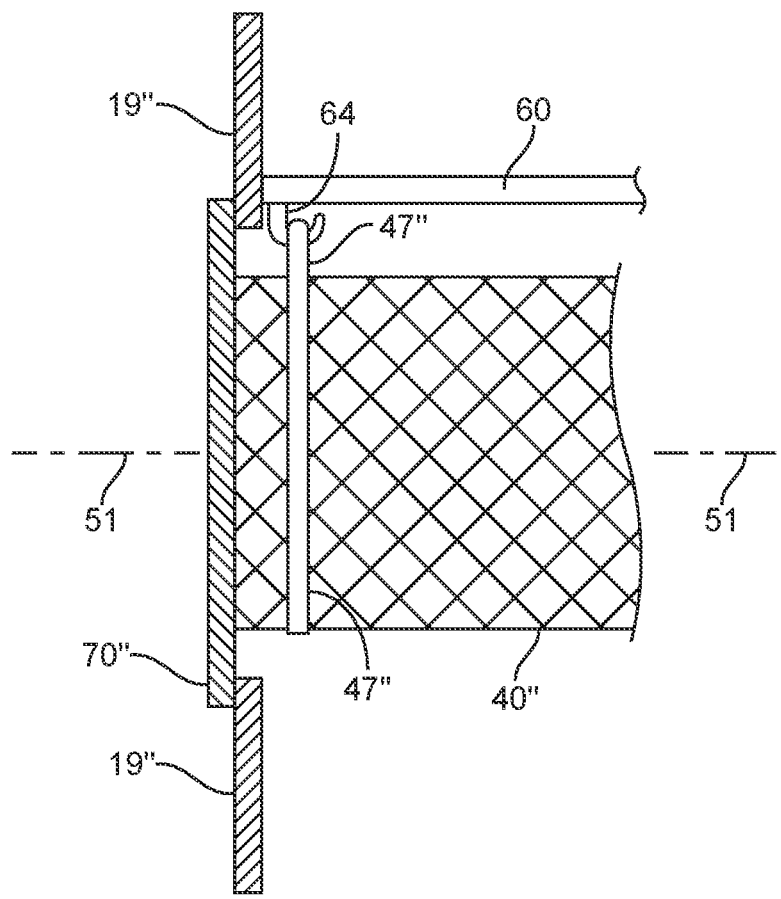
FIG. 6B depicts one alternative embodiment of a bag support that may be provided in one of more embodiments of air filter systems and filter bags as described herein.

FIG. 6B depicts one alternative embodiment of a bag support that may be used to prevent or limit sagging of a filter bag assembly at the second end of the filter bag. In the depicted embodiment, the bag support includes the chamber connector 64 on filter guide 60 similar to that depicted in FIG. 6A which, in the depicted embodiment, is attached to access panel 19" (with cover 70" closing the access opening in the access panel 19" as described herein). The embodiment of a bag support depicted in FIG. 6B includes a sling 47" that may, for example wrap around the bag 40", with the sling 47" forming a loop that is configured to connect to the hook 64 on filter guide 60. In one or more embodiments, the sling 47" may be attached to the filter bag 40" using one or more of, e.g., sewing, adhesives, etc. such that the sling 47" is replaced with the filter bag 40". Alternatively, the sling 47" may be separate, e.g., unattached, to the filter bag 40" such that the sling 47" can be re-used with two or more different filter bags 40".

Figure 6C:
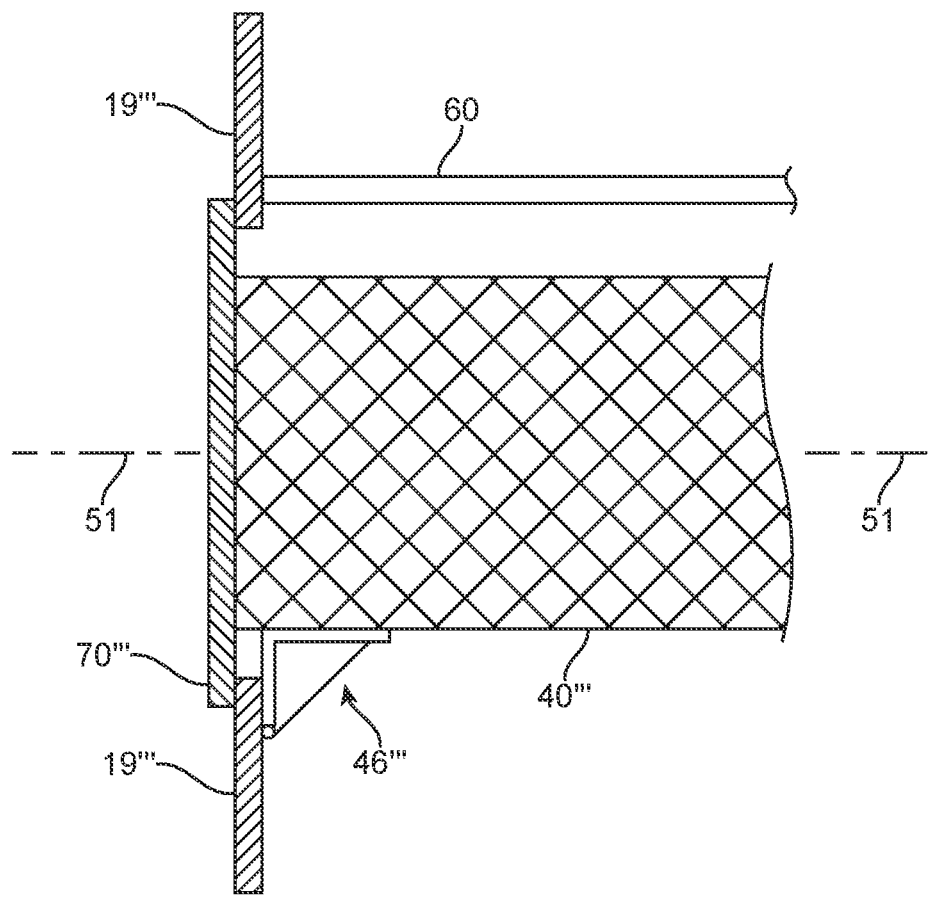
FIG. 6C depicts another alternative embodiment of a bag support that may be provided in one of more embodiments of air filter systems and filter bags as described herein.

FIG. 6C depicts yet another alternative embodiment of a bag support that may be used to prevent or limit sagging of a filter bag assembly at the second end of a filter bag. In the depicted embodiment, the bag support 46''' is in the form of a surface provided proximate the bottom of the filter bag 40'''. The bag support 46''' may be attached to the access panel 19''' and may be accessed through the opening in the access panel 19''' that is closed by cover 70'''. In one or more embodiments, the bag support 46''' may be moved downward (away from the bag axis 51) to assist with replacement of the filter bag 40'''. Movement of the bag support 46''' may include one or both of translational and rotational movement of the bag support 46'''.

Figure 7A:
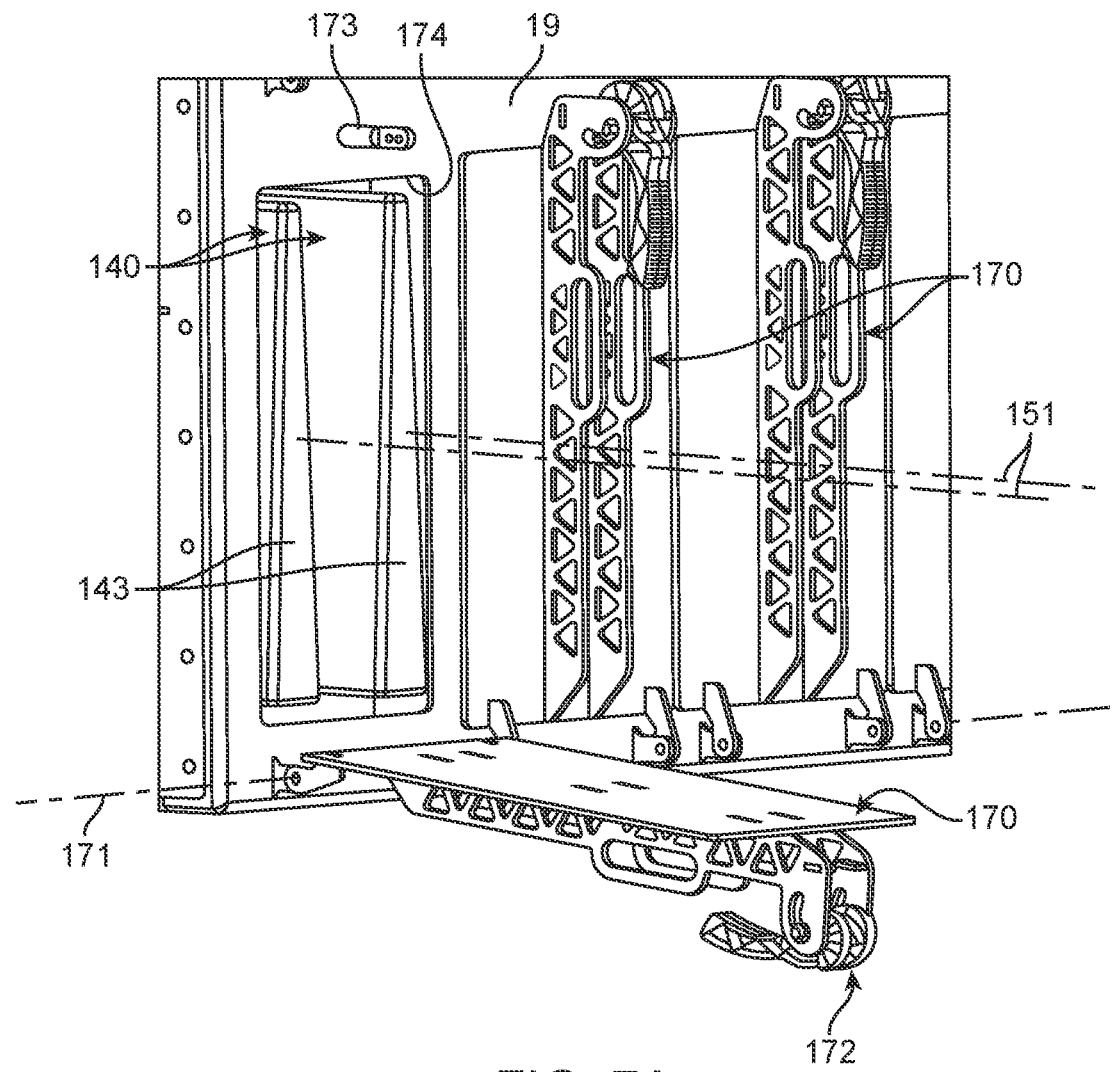
FIG. 7A is a perspective view of one illustrative embodiment of a portion of an access panel including one illustrative embodiment of covers used to close access ports through which filter bag assemblies of air filter systems are passed during removal and replacement.

FIG. 7A is a perspective view of one illustrative embodiment of a portion of a access panel 19 including one illustrative embodiment of a cover 170 used to close a filter access port 174 formed in the access panel 19 through which filter bag assemblies including filter bags 140 can be removed from and inserted into the dirty air chamber 24 of the air filter system 10. The illustrative embodiment of cover 170 includes a latch 172 and catch 173 to secure the cover 170 in a closed position (see the covers 170 to the right of the open cover 170). The covers 170 may be connected to the access panel 19 for rotation about a hinge axis 171 such that the covers 170 can be moved from a closed position to an open position in which filter bag assemblies can be inserted into or removed from the dirty air chamber through access port 174.

Rotation of the cover 170 about hinge axis 171 moves the cover 170 to its closed position in which cover 170 covers filter access port 174. When in the closed position, the cover 170 may, in addition to closing filter access port 174, function as a seal actuator such that the cover 170 also acts on the second ends 143 of the filter bags 140 to force an attached flange assembly against a tubesheet to form a seal as described herein. The forces provided by the cover 171 acting as a seal actuator when closed may be described as acting along the cage axes 151.

Figure 7B:
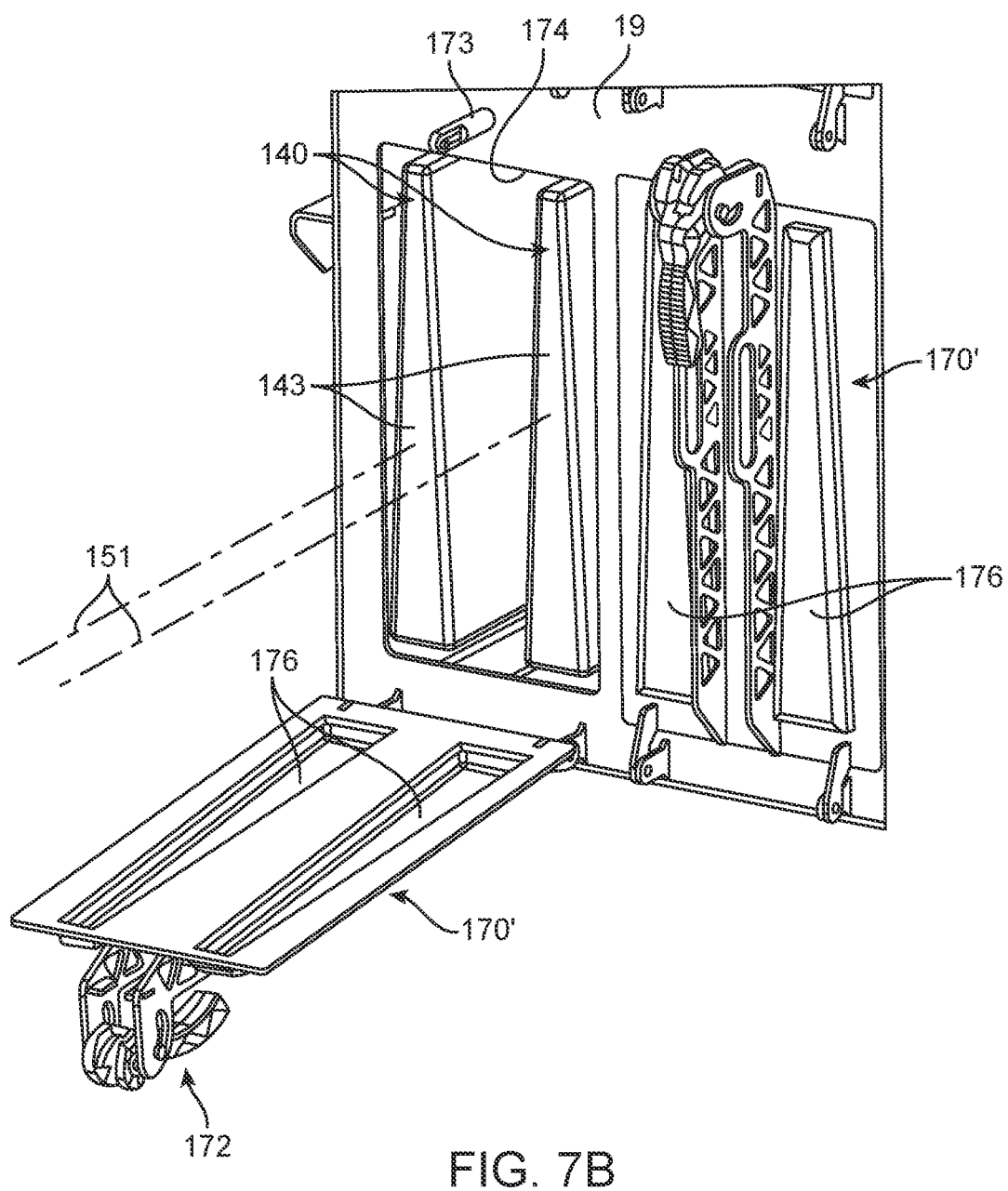
FIG. 7B is a perspective view of alternative illustrative embodiments of a portion of an access panel and covers used to close access ports, with the covers including embossments shaped to complement the filter bag assemblies.

FIG. 7B is a perspective view of the access panel 19 of FIG. 7A including an alternative illustrative embodiment of a cover 170' used to close a filter access port 174 formed in the access panel 19 through which filter bag assemblies including filter bags 140 can be removed from and inserted into the dirty air chamber of the air filter system including access panel 19. This illustrative embodiment of cover 170' also includes a latch 172 and catch 173 to secure the cover 170' in a closed position (see the cover 170' to the right of the open cover 170'). The covers 170' may also be connected to the access panel 19 for rotation about a hinge axis 171 such that the covers 170' can be moved from a closed position to an open position in which filter bag assemblies can be inserted into or removed from the dirty air chamber through access port 174.

Rotation of the covers 170' about hinge axis 171 moves the covers 170' to their closed positions in which covers 170' close filter access port 174. When in the closed position, the covers 170' may, in addition to closing filter access port 174, function as seal actuators such that the covers 170' also act on the second ends 143 of the filter bags 140 to force an attached flange assembly against a tubesheet to form a seal as described herein. The forces provided by the covers 170' acting as seal actuators when closed may be described as acting along the cage axes 151.

An additional feature depicted in covers 170' are the embossments 176 provided in cover 170'. The embossments 176 may, in one or more embodiments, have shapes that are complementary to the shape of the ends 143 of the filter bags 140. Such embossments may provide advantages such as, for example, additional stability to the filter bag assemblies proximate the access panel 19, more uniform force distribution over the second ends 143 of the filter bags 140 and, therefore, over the cages located within the filter bags 140 in filter bag assemblies as described herein, verification of proper installation of the filter bag assemblies (such that, for example, the bottom surfaces of triangular filter bags are properly oriented in a dirty air chamber), etc. In embodiments that include such embossments, a bag support configured to support the second end of the filter bag (as discussed above in connection with, e.g., FIGS. 6A-6C) may be helpful in ensuring that the second ends 143 of the filter bags 140 are properly positioned as the covers 170' are closed.

Figure 8:
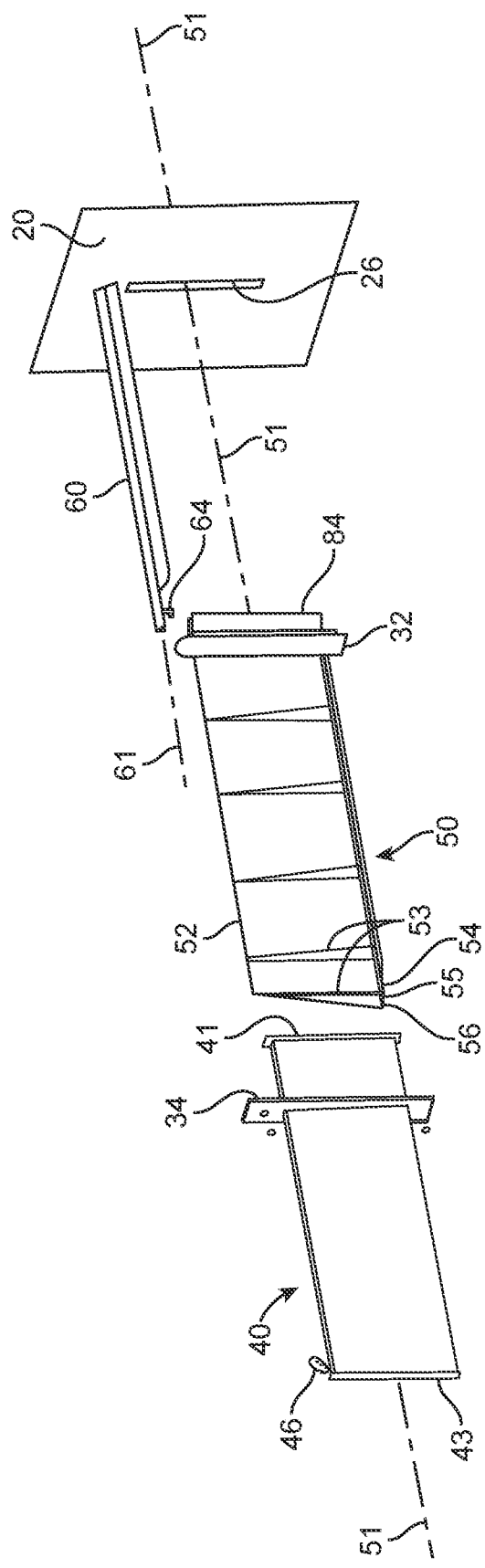
FIG. 8 is an exploded perspective view of the components depicted in FIG. 6.

FIG. 8 is an exploded diagram of the filter bag assembly of FIG. 6 depicting the filter bag 40 removed from the cage 50 and, in addition, the clamp 34 of flange assembly 30 being removed from the base 32. As discussed in connection with other embodiments of filter bags described herein, filter bag 40 includes an opening 41 at its first end and a bag support connector 46 proximate the second end of the filter bag 40.

FIG. 8 also depicts the cage 50 including a top strut 52 and pair of bottom struts 54 and 56, all of which are, in the depicted embodiment, aligned with the cage axis 51. Cage 50 also includes braces 53 extending between the top strut 52 and the bottom struts 54 and 56. At the location of each of the side braces 53, bottom braces 55 may also be provided between the bottom struts 54 and 56 to maintain the triangular shape of the cage 50 by properly positioning the bottom struts 54 and 56.

Another feature depicted in connection with FIG. 8 is that a pulse collector 84 may be attached to the flange assembly 30, in particular, to the base 32 of the depicted flange assembly 30. As a result, removal of the filter bag assembly would include removal of the pulse collector 84 along with the flange assembly 30, cage 50 and filter bag 40. In such a system, the tubesheet aperture 26 in tubesheet 20 is preferably sized to accommodate the pulse collector 84. Furthermore, a seal may preferably be provided on the tubesheet face of the flange assembly to seal the junction between the flange assembly 30 and the tubesheet 20 as described herein.

Figure 9B:
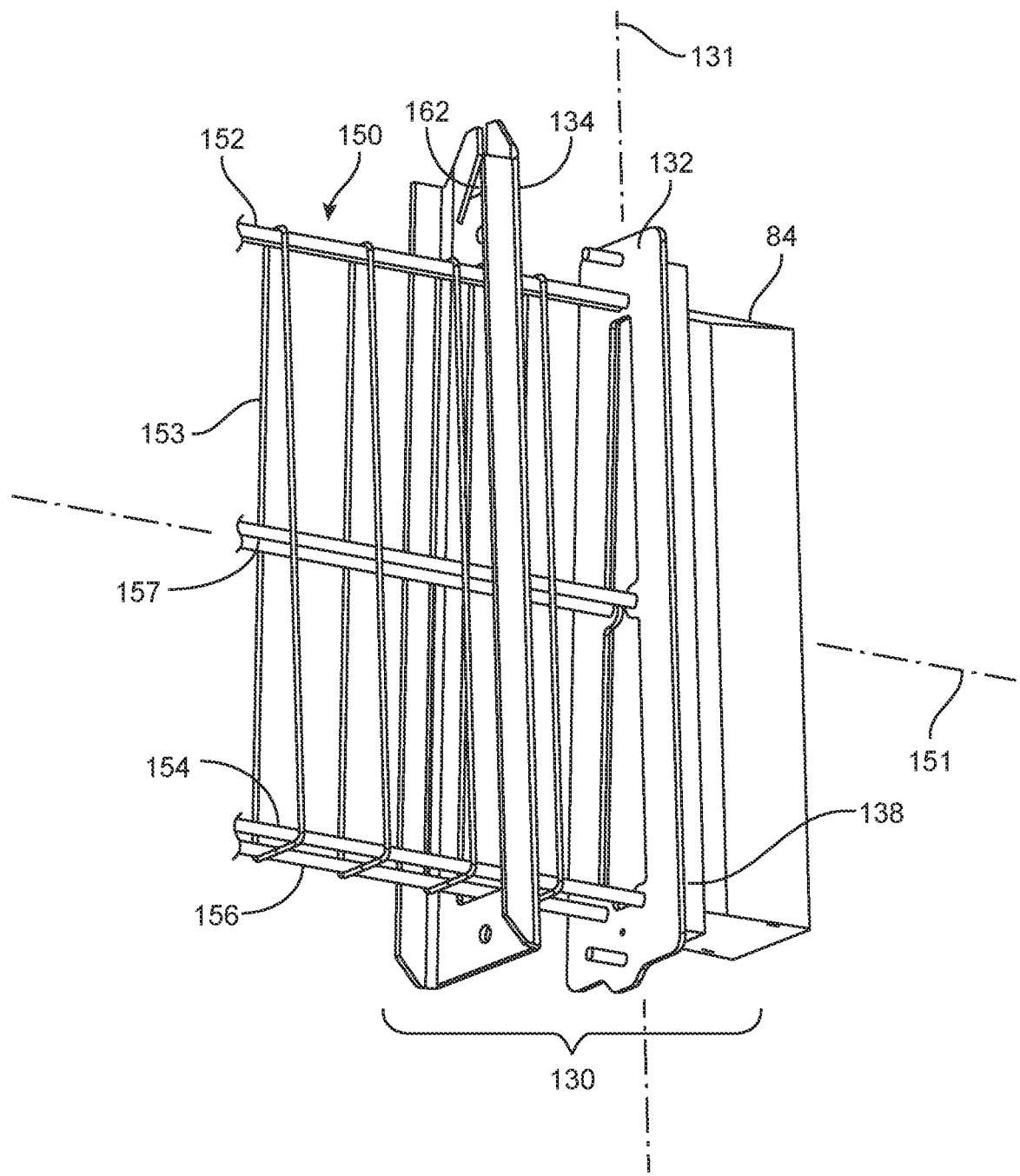
FIG. 9B is an enlarged and exploded right side perspective view of the flange assembly of FIG. 9A.
Figure 9C:
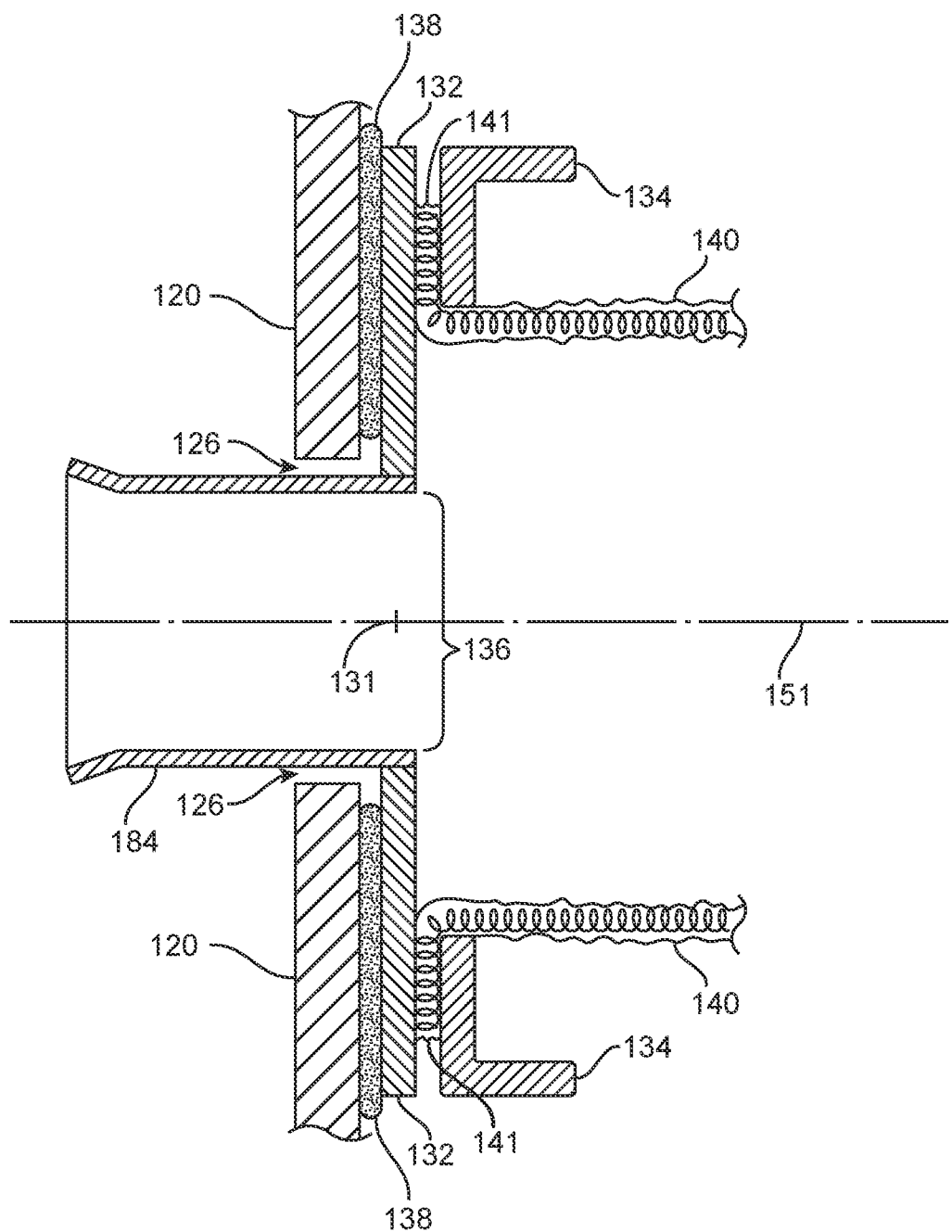
FIG. 9C is an enlarged cross-sectional view of the flange assembly and cage depicted in FIG. 9A taken along line 9C-9C in FIG. 9A (only those surfaces at the plane defined by the cross-sectional line are depicted in FIG. 9C).

FIGS. 9A-9C depict another illustrative embodiment of components of a filter bag assembly as described herein including a flange assembly 130 and cage 150 attached to the flange assembly 130. The filter bag that would be provided over the cage 150 with an opening attached to the flange assembly 130 is not depicted in FIGS. 9A and 9B for clarity.

The flange assembly 130 depicted in FIGS. 9A-9C includes a clamp 134 and base 132, with the clamp 134 and base 132 shown as separated from each other along the cage axis 151 in FIG. 9B. The depicted flange assembly 130 also includes a clean air outlet 136 that is elongated along an outlet axis 131. A guide aperture 162 is provided at the top of the flange assembly 130 for use with a filter guide as described in connection with other illustrative embodiments presented herein. A portion of seal 138 which is located on the tubesheet face of the flange assembly 130 and which extends around the clean air outlet 136 is also depicted in FIGS. 9A-9C.

The cage 150 depicted in FIGS. 9A-9B includes a top strut 152 and a pair of bottom struts 154 and 156, all of which are, in the depicted embodiment, aligned with the cage axis 151. Cage 150 also includes braces 153 extending between the top strut 152 and the bottom struts 154 and 156. The depicted cage 150 also includes an intermediate strut 157 aligned with the cage axis 151. The additional intermediate strut 157 may provide further structural integrity to the cage 150 and may, in one or more embodiments, enhance the uniformity of any seal force transferred through the cage 152 the flange assembly 132 form a seal as described herein.

Another feature depicted in FIGS. 9A-9C is a pulse collector 184 attached to the flange assembly 130. In one or more embodiments, removal of a filter bag assembly including flange assembly 130 and cage 150 would also remove the pulse collector 184.

An enlarged cross-sectional view of a portion of the components depicted in FIG. 9A is provided in FIG. 9C, with the tubesheet 120 and tubesheet aperture 126 also being depicted in FIG. 9C. It should be understood that only those components actually visible in the plane of the cross-sectional view are depicted in FIG. 9C. Both the outlet axis 131 and the cage axis 151 are depicted in FIG. 9C for reference.

With reference to FIG. 9C, the base 132 and clamp 134 of the flange assembly 130 are seen in FIG. 9C along with the bag opening 141 of filter bag 140 being clamped between the base 132 and clamp 134. Clean air outlet 136 formed in the base 132 of the flange assembly provides for passage of air into or out of the interior volume defined by the filter bag 140 as described herein.

In one or more embodiments, the filter media forming the filter bag opening 141 may, itself, provide for seal between the flange assembly and the filter bag opening 141 that is sufficient to prevent leakage such that air entering or leaving the interior volume of the filter bag 140 must pass through the filter media of the bag or the clean air outlet 136. Alternatively, additional seals and/or sealing material may be provided to prevent unwanted passage of air between the flange assembly and the filter bag opening 141. For example, the bag opening 141 may include a compressible seal/cuff (similar to that found in, e.g., cuff 649 of filter bag 640 depicted in FIGS. 17-19) that may enhance sealing of the bag opening 141 between the base 132 and the clamp 134 to prevent the passage of air and/or particulate matter through the interface between the base 132, the clamp 134, and filter bag opening 141.

The tubesheet face of the clamp assembly (i.e., the face of base 132 facing tubesheet 120) acts on seal 138 which is located between base 132 and tubesheet 122 prevent the passage of air and/or particulate matter between the flange assembly base 132 and the tubesheet 120 during operation of an air filter system. Pulse collector 184 is depicted as being attached to the base 132 of the flange assembly in this illustrative embodiment.

As discussed herein, the filter bags used in the filter bag assemblies of air filter systems described herein are made of generally flexible filter media, the filter bags may not form particularly distinct triangles when viewed in cross-section. In general, however, the triangular-shaped filter bags and their associated cages can be described using the geometry of triangles with an understanding that the edges, sides, and vertices of such triangles will be generally approximated by the triangular cages and filter bags fitted thereon.

With that understanding, reference is made to FIGS. 10-13 in which various triangular-shaped bag constructions that may be used in one or more embodiments of filter bag assemblies and air filter systems using the filter bag assemblies as described herein.

Figure 10:
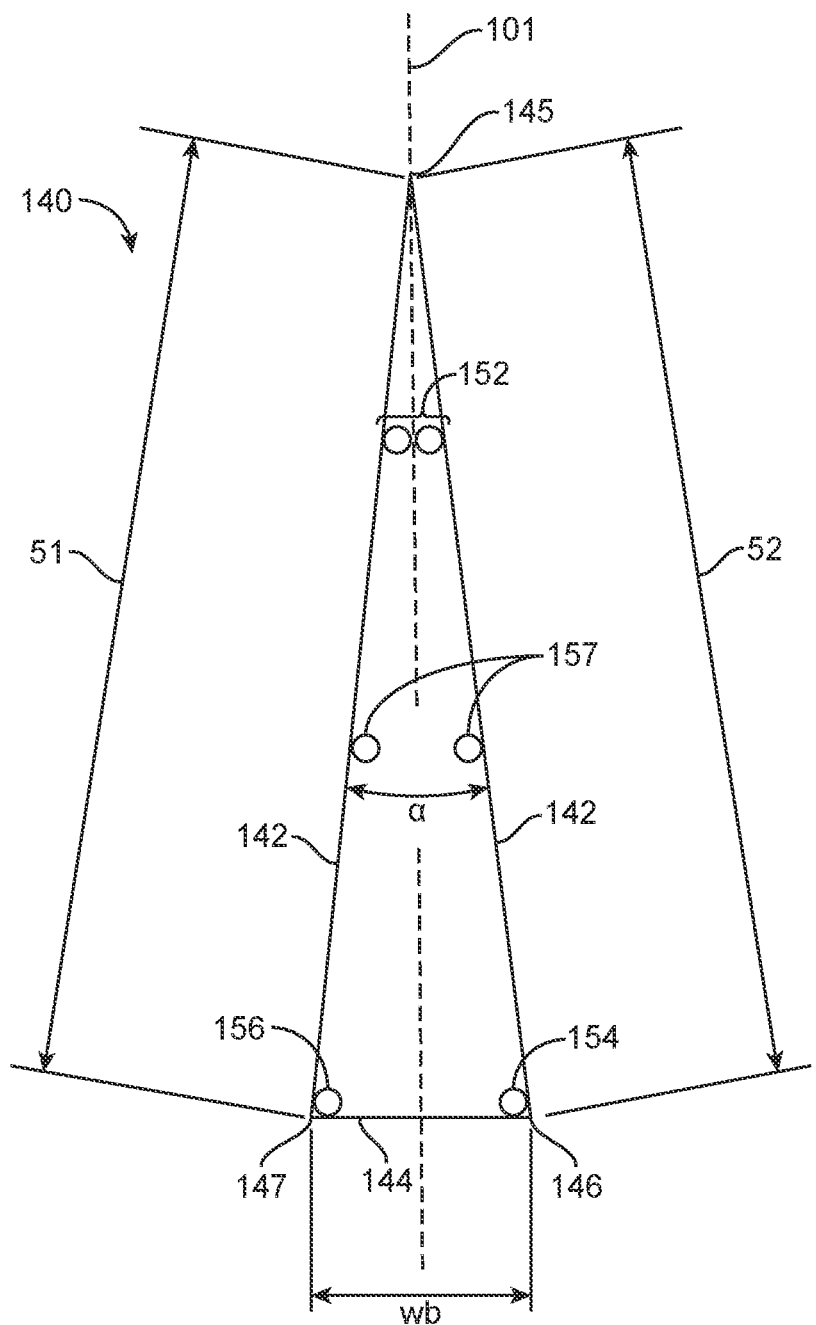
FIG. 10 is a diagram of one illustrative embodiment of a triangle formed by one illustrative embodiment of a filter bag used in an air filter system as described herein.

The idealized triangular-shaped bag 140 depicted in FIG. 10 is, in many respects, similar to the triangular-shaped bag 40 discussed herein with respect to various embodiments of the filter bag assemblies and air filter systems described above. The triangular-shaped bag 140 includes a top vertex 145 and a pair of bottom vertices 146 and 147. A pair of side surfaces 142 extend between the top vertex 145 and each of the bottom vertices 146 and 147. A bottom surface 144 extends between the bottom vertices 146 and 147.

To further illustrate the difference between an idealized triangular-shaped defined by one or more embodiments of filter bags as described herein and the actual shapes taken by filter bags located on cages that provide the triangular shapes, the struts of cage 150 as seen in FIGS. 9A-9B are included in FIG. 10 along with cage axis 151 (which extends perpendicularly out of the paper on which FIG. 10 is located). In particular, top strut 152, bottom struts 154 and 156, and intermediate struts 157 are depicted inside filter bag 140 in FIG. 10. It should be noted that top strut 152 may, as depicted in this illustrative embodiment be formed as a composite of two members. Such a construction may provide filter bag 140 with a small flat surface along its top edge. Reference can be had to, e.g., FIGS. 7A and 7B where filter bag 140 has a relatively small flat top edge as a result of a somewhat widened top strut. Regardless of the slight deviations from a perfect triangle, it can be seen that the side surfaces 142 and bottom surface 144 of the filter bag 140 take on a generally triangular shape as described herein.

The bottom surface 144 may be described as having a width wb extending between the bottom vertices 146 and 147. The left side surface 142 may be described as having a height s1 measured between the top vertex 145 and bottom vertex 147. The right side surface 142 may be described as having a height s2 measured between the top vertex 145 and bottom vertex 146. As discussed herein the width of the bottom surface (wb) is preferably less than the height of either of the side surfaces (s1 or s2).

Although not required, the depicted triangular-shaped bag 140 forms a triangle that may be described as being an acute triangle and, optionally, an isosceles triangle (in which s1=s2). In the case of an isosceles triangle, the axis 101 depicted in FIG. 10 may be described as being an altitude of the triangle formed by the filter bag 140.

The triangular-shaped bag 140 may further be described with respect to the angle formed by the side surfaces 142. In particular, the angle α (alpha) formed by side surfaces 142 at vertex 145 may be selected such that the width (wb) of the bottom surface 144 has a selected relationship with the heights of the side surfaces 142. In one or more embodiments, the angle α (alpha) may be 45° or less, 30° or less, 20° or less, 15° or less, 12° or less, 10° or less, or 5° or less. At a lower end, the angle α (alpha) may be, in one or more embodiments, 2° or more, 3° or more, 4° or more, or 5° or more.

Figures 11, 12:
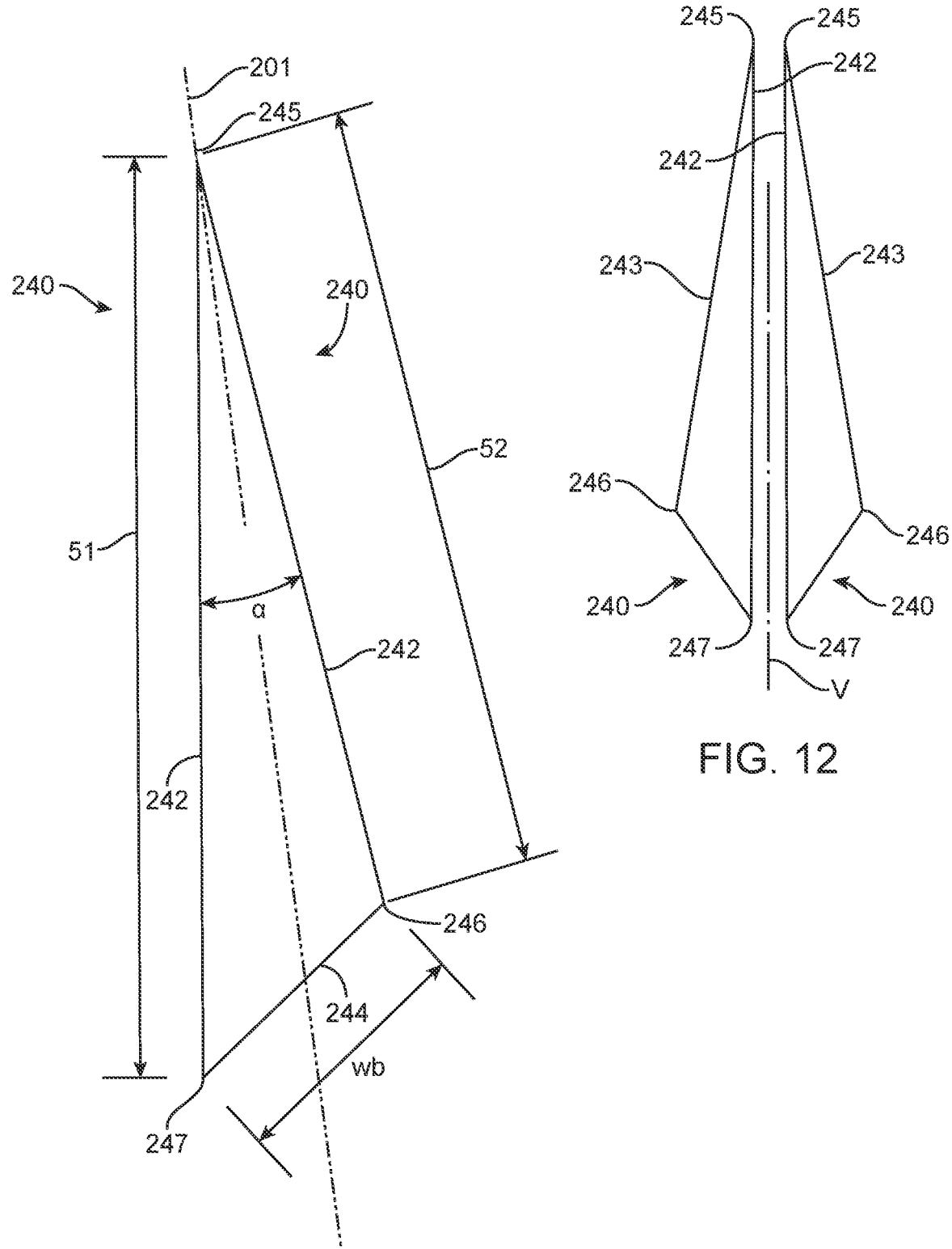
FIG. 11 is a diagram of another illustrative embodiment of a triangle formed by another illustrative embodiment of a filter bag used in an air filter system as described herein.
FIG. 12 is a diagram depicting one illustrative example of a possible arrangement of a pair of filter bags as depicted in FIG. 11.

FIG. 11 depicts one alternative triangular-shaped filter bag that may be used in one or more embodiments of a filter bag assembly and/or air filter system as described herein. The triangular-shaped bag 240 includes a top vertex 245 and a pair of bottom vertices 246 and 247. A pair of side surfaces 242 extend between the top vertex 245 and each of the bottom vertices 246 and 247. A bottom surface 244 extends between the bottom vertices 246 and 247. When mounted on a cage in a filter bag assembly as described herein, the cage axis would extend perpendicularly out of the paper on which FIG. 11 is located.

The bottom surface 244 may be described as having a width wb extending between the bottom vertices 246 and 247. The left side surface 242 may be described as having a height s1 measured between the top vertex 245 and bottom vertex 247. The right side surface 242 may be described as having a height s2 measured between the top vertex 245 and bottom vertex 246. As discussed herein the width of the bottom surface (wb) is preferably less than the height of either of the side surfaces (s1 or s2).

The triangular-shaped bag 240 may optionally be described with respect to the angle formed between the side surfaces 242 at vertex 245. In particular, the angle α (alpha) formed by side surfaces 242 at vertex 245 may be selected such that the width (wb) of the bottom surface 244 has a selected relationship with the heights of the side surfaces 242. In one or more embodiments, the angle α (alpha) may be 45° or less, 30° or less, 20° or less, 15° or less, 12° or less, 10° or less, or 5° or less. At a lower end, the angle α (alpha) may be, in one or more embodiments, 2° or more, 3° or more, 4° or more, or 5° or more.

The depicted triangular-shaped bag 240 forms a triangle that may be described as being an obtuse triangle. The axis 201 depicted in FIG. 11 may be described as bisecting the angle α (alpha) and, as a result, the axis 201 also bisects the bottom surface 244. In one or more embodiments of triangular-shaped filter bags as described herein, the axis passing through the top vertex and bisecting the angle formed at that vertex may preferably be oriented generally vertically within the dirty air chamber of an air filter system. With respect to the embodiment of triangular-shaped filter bag 240, axis 201 may be oriented vertically or, alternatively, the axis 201 may canted or angled with respect to a vertical axis Although the bottom surface 244 of the triangular-shaped filter bag 240 may not be oriented transverse to the vertical axis, particulate matter dislodged from the bottom surface 244 during pulse cleaning would have a vertical force component that, when added to the force applied by gravity, would preferentially move the dislodged particulate matter downward as described in connection with other illustrative embodiments of filter bags described herein.

FIG. 12 depicts a pair of triangular-shaped filter bags 240. The triangular-shaped filter bag 240 on the right side of FIG. 12 has essentially the same shape as the filter bag 240 depicted in FIG. 11. The triangular-shaped filter bag 240 on the left side of FIG. 12 is a mirror image of the filter bag 240 on the right side of FIG. 12. Both the left and right side triangular-shaped filter bags 240 include vertically oriented surfaces 242 facing each other and aligned with a vertical axis V, while the outer side surfaces 243 of the triangular-shaped filter bags 240 face away from each other. One potential advantage of such an arrangement is that the triangular-shaped filter bags 240 may be spaced closer together (in a direction transverse to the vertical axis), thus increasing the surface area of filter media available within a given dirty air chamber volume while retaining the particulate loading and pulse cleaning advantages that may be associated with triangular-shaped filter bags as described herein.

Figure 13:
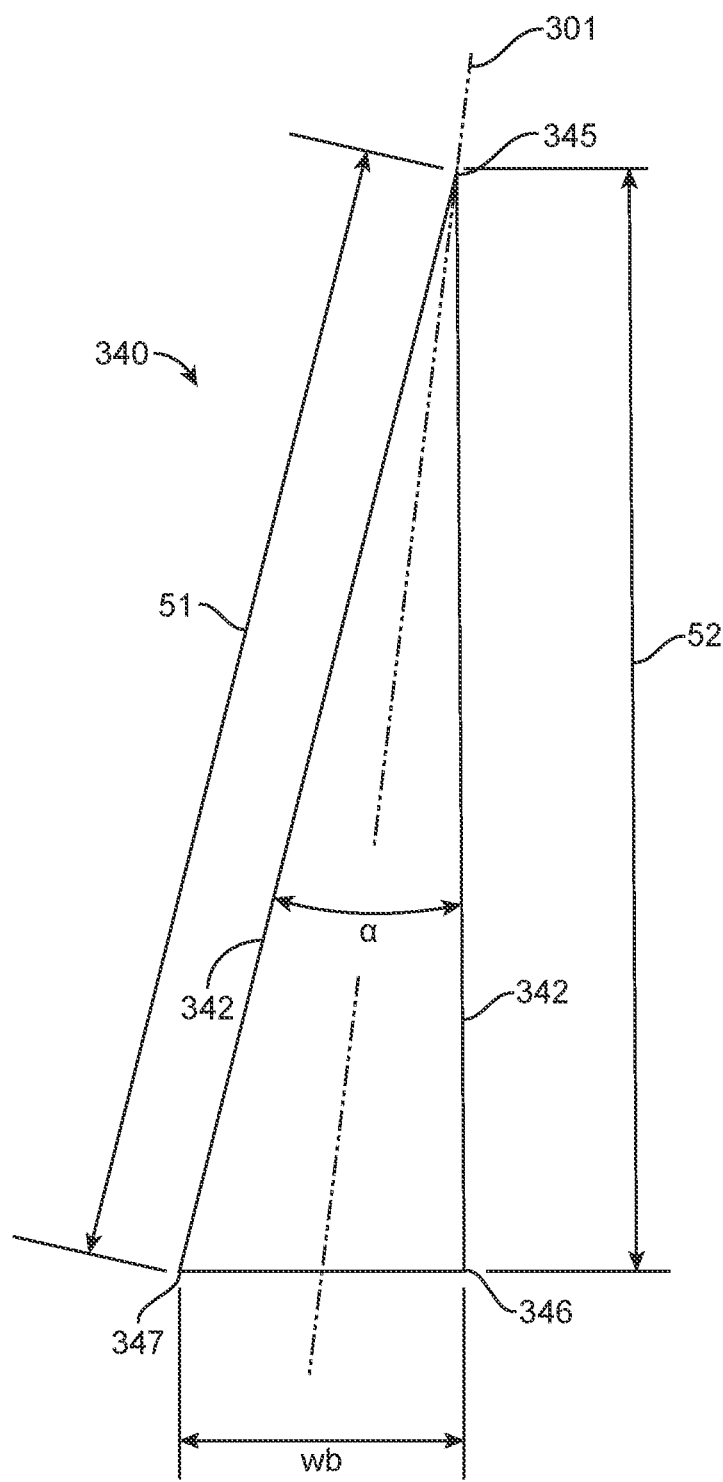
FIG. 13 is a diagram of another illustrative embodiment of a triangle formed by another illustrative embodiment of a filter bag used in an air filter system as described herein.

FIG. 13 depicts one alternative triangular-shaped filter bag that may be used in one or more embodiments of a filter bag assembly and/or air filter system as described herein. The triangular-shaped bag 340 includes a top vertex 345 and a pair of bottom vertices 346 and 347. A pair of side surfaces 342 extend between the top vertex 345 and each of the bottom vertices 346 and 347. A bottom surface 344 extends between the bottom vertices 346 and 347. When mounted on a cage in a filter bag assembly as described herein, the cage axis would extend perpendicularly out of the paper on which FIG. 13 is located.

The bottom surface 344 may be described as having a width wb extending between the bottom vertices 346 and 347. The left side surface 342 may be described as having a height s1 measured between the top vertex 345 and bottom vertex 347. The right side surface 342 may be described as having a height s2 measured between the top vertex 345 and bottom vertex 346. As discussed herein the width of the bottom surface (wb) is preferably less than the height of either of the side surfaces (s1 or s2).

The triangular-shaped bag 340 may optionally be described with respect to the angle formed between the side surfaces 342 at vertex 345. In particular, the angle α (alpha) formed by side surfaces 342 at vertex 345 may be selected such that the width (wb) of the bottom surface 344 has a selected relationship with the heights of the side surfaces 242. In one or more embodiments, the angle α (alpha) may be 45° or less, 30° or less, 20° or less, 15° or less, 12° or less, 10° or less, or 5° or less. At a lower end, the angle α (alpha) may be, in one or more embodiments, 2° or more, 3° or more, 4° or more, or 5° or more.

The depicted triangular-shaped bag 340 forms a triangle that may be described as being a right triangle. The axis 301 depicted in FIG. 13 may be described as bisecting the bottom surface 344. In one or more embodiments of triangular-shaped filter bags as described herein, the axis passing through the top vertex and bisecting the bottom surface may be oriented generally vertically within the dirty air chamber of an air filter system.

With respect to the embodiment of triangular-shaped filter bag 340, axis 301 may be oriented vertically or, alternatively, the right side surface 342 (forming a right angle with the bottom surface 344) may be oriented vertically such that the bottom surface 344 is oriented generally horizontally to a vertical axis. As used herein, the phrase "generally horizontal" (and variations thereof) means that the component or components (e.g., a filter bag and/or filter bag assembly with cage) is/are arranged such that the component or components form an angle of 45 degrees or less, 30 degrees or less, 20 degrees or less, or 15 degrees or less off of a horizontal line (where gravitational force vectors define the vertical axis). For example, the cage axis or filter bag axis may define such an angle with a horizontal line if the filter bag and/or cage is canted with respect to perfectly horizontal line.

Even if the bottom surface 344 of the triangular-shaped filter bag 340 is not oriented transverse to the vertical axis (where, for example, the axis 301 is oriented vertically), particulate matter dislodged from the bottom surface 344 during pulse cleaning would have a vertical force component that, when added to the force applied by gravity, would preferentially move the dislodged particulate matter downward as described in connection with other illustrative embodiments of filter bags described herein.

Figure 14:
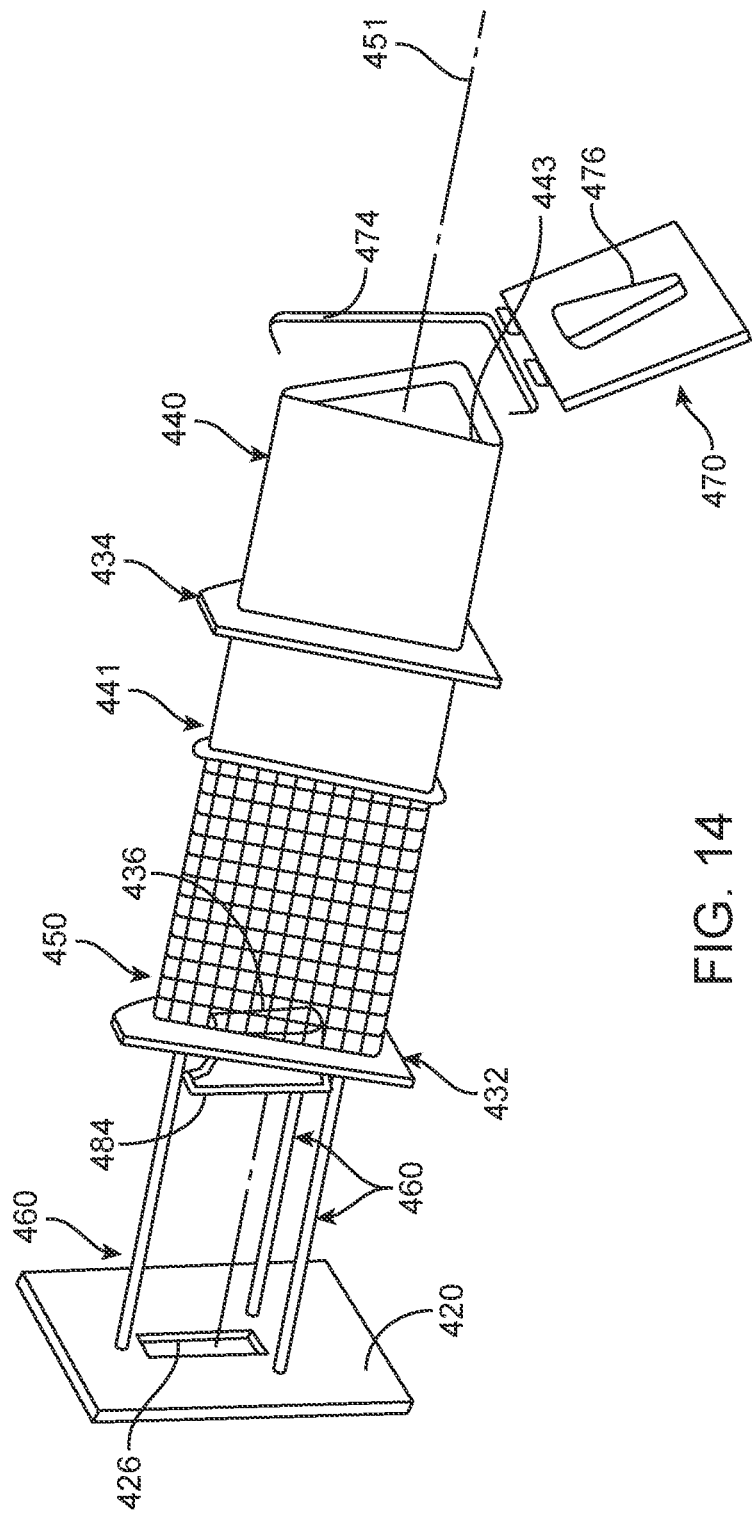
FIG. 14 is a perspective view of a portion of a tubesheet, with another illustrative embodiment of a filter bag assembly supported on another illustrative embodiment of a filter guide as described herein.

Another illustrative embodiment of a filter bag assembly supported on a filter guide attached to a tubesheet is depicted in a perspective view in FIG. 14. The depicted filter bag assembly includes a flange assembly that, in the depicted embodiment, includes a base 432 and a clamp 434, along with a filter bag 440 and a cage 450 attached to the base 132 of the flange assembly. A clean-air outlet 436 is formed in the base 432 of the flange assembly to allow for passage of air into or out of the interior volume of the filter bag 440. The cage 450 extends away from the flange assembly along a cage axis 451 and is used to support filter bag 440 in a selected shape (e.g., triangular, as depicted).

The filter bag assembly of FIG. 14 also includes a pulse collector 484 attached to the base 432 of the flange assembly and configured to pass through the aperture 426 in tubesheet 420 when the filter bag assembly is properly positioned for use in a dirty air chamber.

The air filter system depicted in FIG. 14 also includes an alternative illustrative embodiment of a filter guide used to support the filter bag assembly (i.e., the flange assembly including base 432 and clamp 434, filter bag 440, and cage 450). The depicted embodiment of a filter guide includes struts 460 that are attached to tubesheet 420 and extend away from tubesheet 420 along cage axis 451. The struts 460 of this embodiment of a filter guide can be contrasted with the external filter guide 60 seen in, e.g., the illustrative embodiment depicted in FIGS. 4A-4G and 6A.

Another optional feature depicted in connection with the illustrative embodiment of a filter bag assembly and associated air filter system structure depicted in FIG. 14 is a cover 470 used to close an access port 474 in an access panel. The cover 470 includes embossments 476 that may, in one or more embodiments, be configured to have a shape that is complementary to the shape of the second end 443 of the filter bag 442, as described herein, such embossments may provide advantages such as, for example, additional stability to the filter bag assemblies proximate the access panel, more uniform force distribution over the second end 443 of the filter bag 440 and, therefore, over the cage located within the filter bag 440, verification of proper installation of the filter bag assemblies (such that, for example, the bottom surface of the triangular filter bag is properly oriented in the dirty air chamber), etc.

Figure 15:
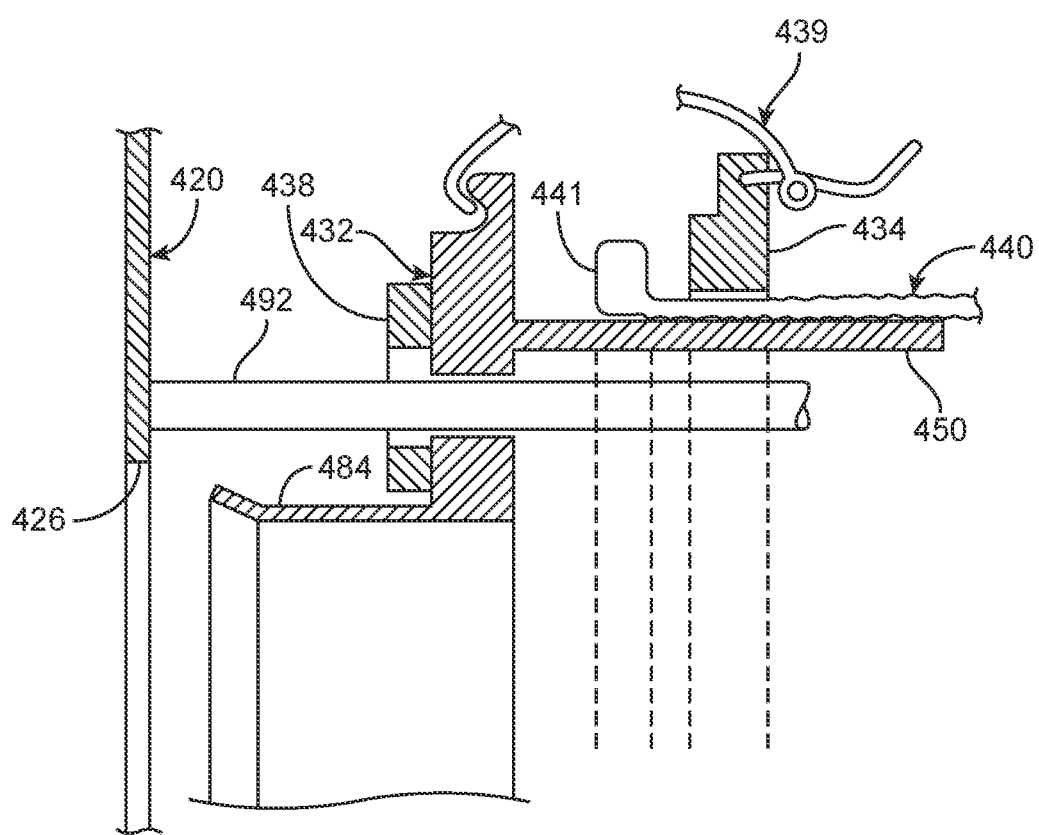
FIG. 15 is an enlarged partial cross-sectional view of the filter bag assembly of FIG. 14 depicting illustrative embodiments of the junctions between the flange assembly components, filter, and tubesheet.

FIG. 15 is an enlarged partial cross-sectional view of the filter bag assembly of FIG. 14 depicting illustrative embodiments of the junctions between the flange assembly components, filter, and tubesheet. In particular, the view of FIG. 15 depicts filter bag 440 supported on filter cage 450. Filter cage 450 is attached to the base 432 of the flange assembly with the bag opening 441 captured between the clamp 434 and base 132 of the flange assembly. The bag opening 441 may include a compressible seal/cuff (similar to that found in, e.g., cuff 649 of filter bag 640 depicted in FIGS. 17-19) that may enhance sealing of the bag opening 441 between the base 432 and the clamp 434 to prevent the passage of air and/or particulate matter through the interface between the base 432, the clamp 434, and filter bag opening 441. Another optional component depicted in FIG. 15 is a clamp assembly 439 used to secure clamp 434 on base 432, with opening 441 of filter bag 440 secured therebetween. Clamp 439 may take any of a suitable number of forms such as, e.g., a spring clamp assembly similar to those used in connection with, e.g., many other filter cartridges and elements.

FIG. 15 also depicts a seal 438 located on the base 432 of the flange assembly. The seal 438 faces the tubesheet 420 and, when the base 132 of the flange assembly is moved into contact with the tubesheet 420, the seal 438 preferably forms a seal between the base 132 and the tubesheet 420 that prevents the passage of air and/or particulate matter through the interface between the flange assembly and the tubesheet 420 as described in connection with other illustrative embodiments herein.

Figure 16:
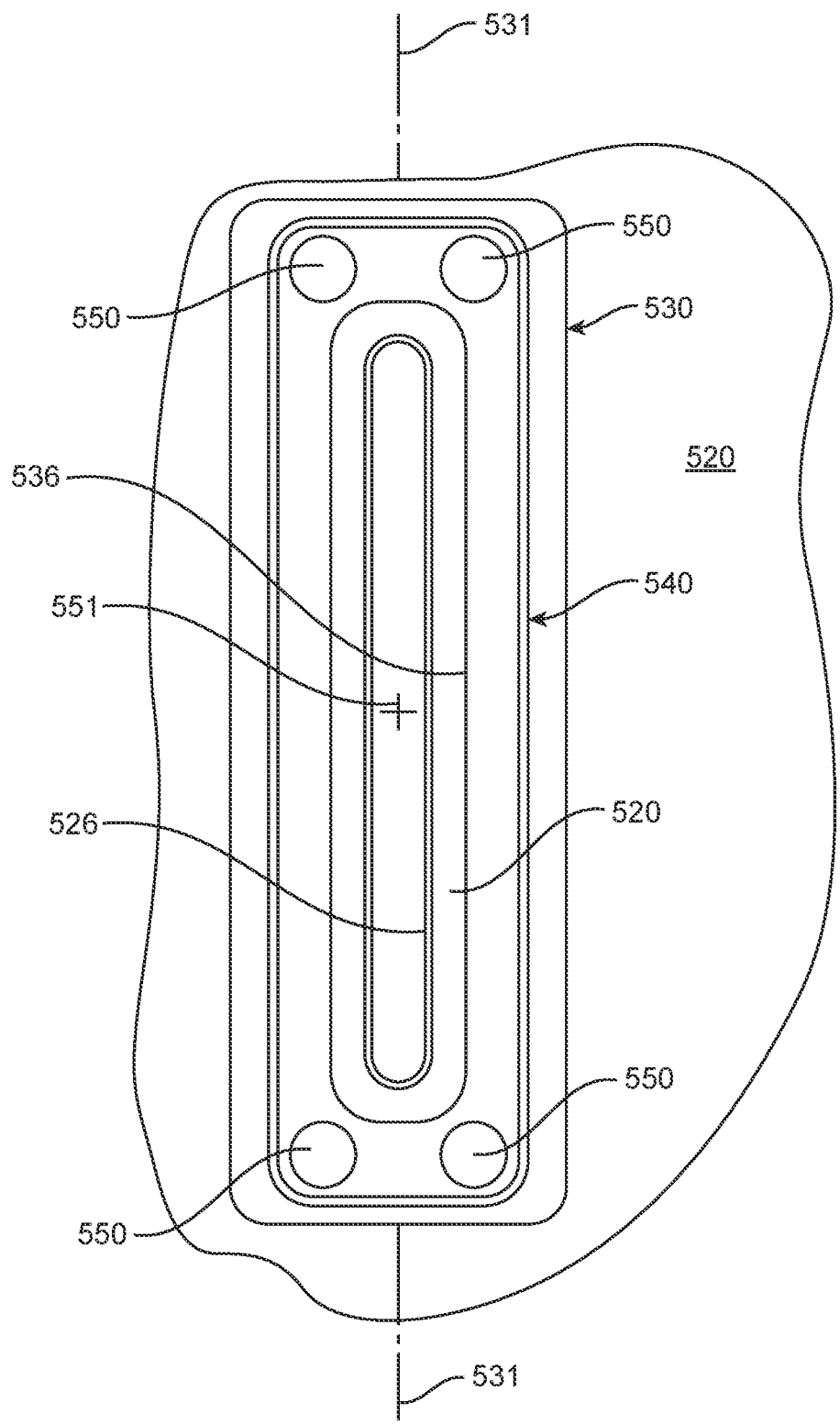
FIG. 16 is a cross-sectional view of another illustrative embodiment of a filter bag assembly including an envelope-shaped filter bag supported by a cage on a flange assembly as described herein.

FIG. 16 is a cross-sectional view of another illustrative embodiment of a filter bag assembly including an envelope-shaped filter bag 540 supported by a cage 550 on a flange assembly 530 as described herein. Although some illustrative embodiments of air filter systems and filter bag assemblies described herein may advantageously use filter bags and cages that result in triangularly shaped filter bags, many of the advantages and benefits associated with filter bag assemblies that are compressed within a dirty air chamber as described herein are also available in connection with filter bags on filter bag assemblies having any selected shape.

In particular, FIG. 16 depicts one embodiment of a more conventional envelope-shaped filter bag assembly in which the opposite major sides of the filter bag 540 are generally parallel to each other in use (e.g., have an angle α (alpha) that is essentially 0° (with reference to FIGS. 10-13)). The filter bag 540 is mounted on a cage constructed of struts 550 that define the envelope shape of the filter bag 540 mounted thereon.

The struts 550 are attached to a flange assembly 530 that includes a clean air outlet 536 as described in connection with other embodiments of flange assemblies of filter bag assemblies as described herein. The clean air outlet 536 is, in the depicted illustrative embodiment elongated along an outlet axis 531 as described in connection with other illustrative embodiments herein.

The struts 550 of the cage attached to the flange assembly 530 also extend away from that flange assembly 530 along a cage axis 551 to a distal end where they support a second end of the filter bag 540 as described in connection with other illustrative embodiments herein. Also depicted in FIG. 16 are a portion of the tubesheet 520 against which flange assembly 530 is forced to provide a seal, along with an aperture 526 in the tubesheet 520 through which air passes into or out of the clean air chamber located on the opposite side of the tubesheet 520.

Figure 17:
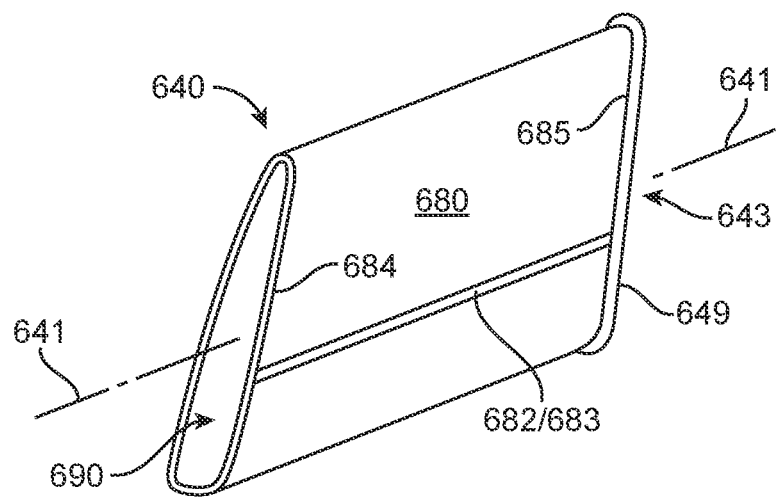
FIG. 17 is a perspective view of one illustrative embodiment of a triangular filter bag that may be used in one or more embodiments of the filter bag assemblies and air filter systems described herein.
Figure 18:
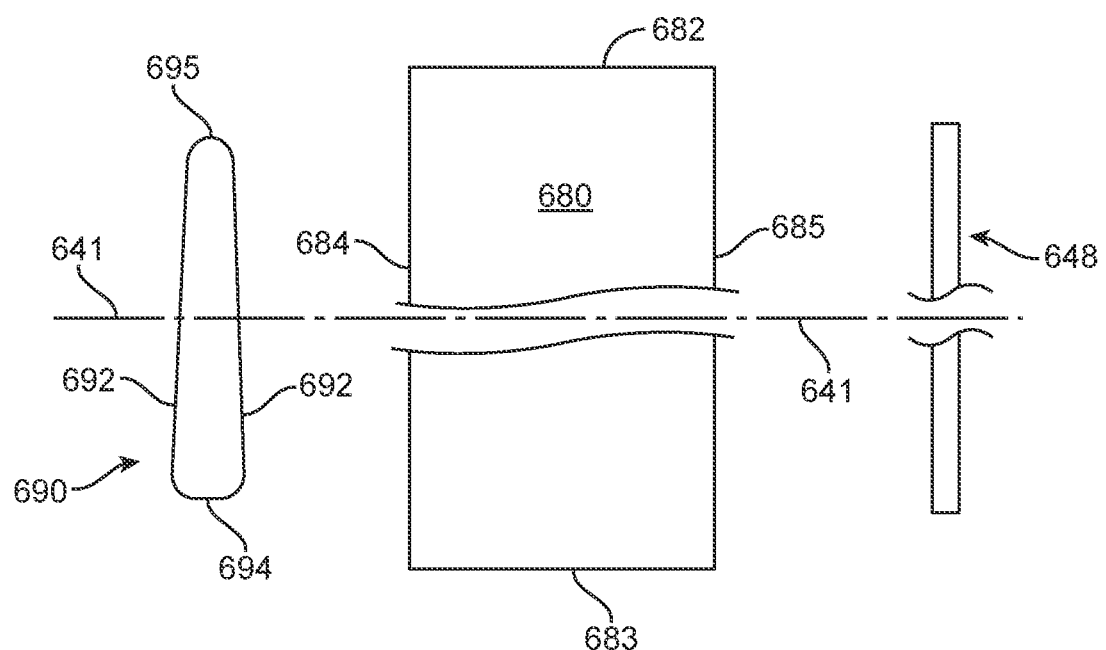
FIG. 18 depicts components that may be used to construct the illustrative embodiment of the triangular filter bag depicted in FIG. 17.
Figure 19:
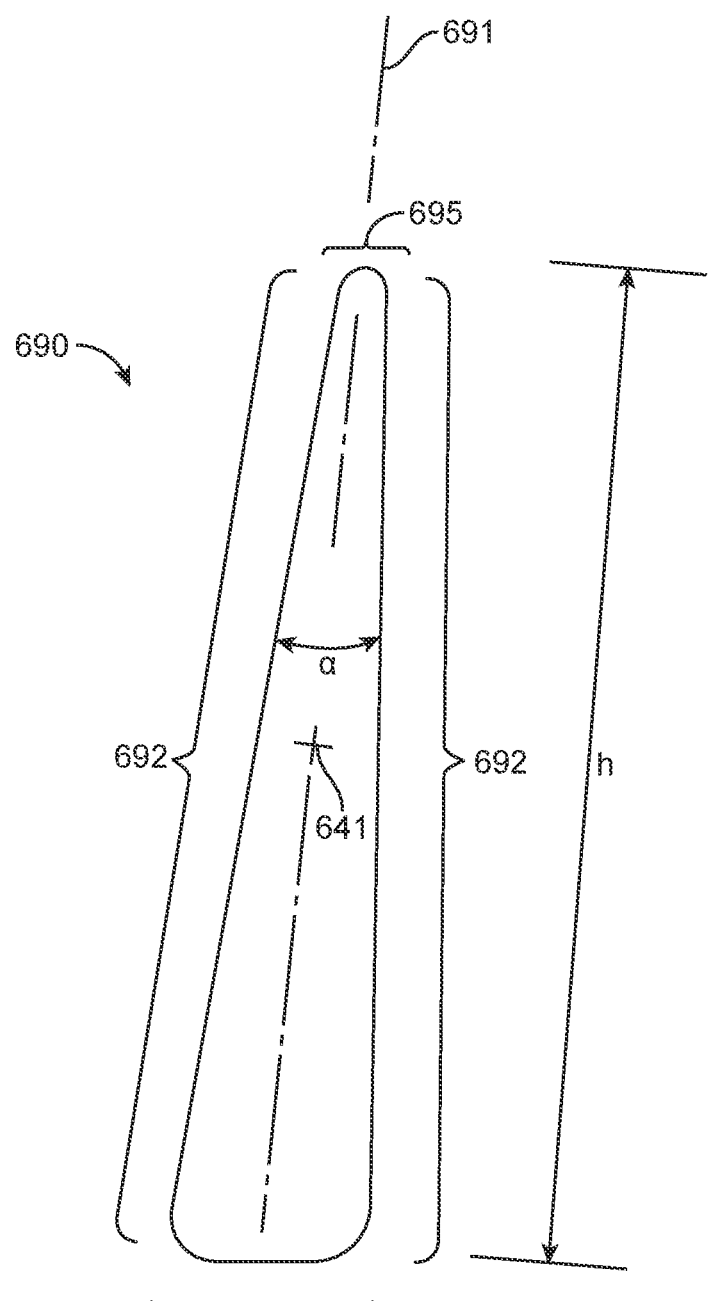
FIG. 19 is a schematic diagram illustrating relationships between the features of the illustrative embodiment of the triangular end cap depicted in FIGS. 17-18.

FIGS. 17-19 depict one illustrative embodiment of a triangular filter bag that may be used in one or more embodiments of filter bag assemblies and air filter systems as described herein. The triangular filter bag 640 includes an opening 643, a closed end provided by a substantially triangular end cap 690, and a body 680 extending from the opening 643 to the closed end along a bag axis 641 that extends between the opening 643 to the closed end of the filter bag 640.

The body 680 of the triangular filter bag 640 is formed of filter media suitable for removing particulate matter from air in the application for which it is intended. In one or more embodiments, the body 680 may consist essentially of filter media with no other components provided. With reference to FIG. 18, the body 680 may include seam edges 682 and 683 that are attached to each other to form a longitudinal seam 682/683 as seen in, e.g., FIG. 17. When the seam edges 682/683 are attached to each other, the body may be described as taking a tubular shape that defines an interior volume between the opening 643 and the closed end defined by the triangular end cap 690. In that tubular shape, the filter media of the body 680 also defines a closed end edge 684 located at the closed end of the filter bag 640 and an opening edge 685 located at the opening 643 of the filter bag 640.

In one or more embodiments, the junction between the longitudinal seam 682/683 with the triangular end cap 690 may be located along one of the side edges 692 of the triangular end cap 690 between the bottom edge 694 and the apex 695 of the triangular end cap. In one or more alternative embodiments, a junction between a longitudinal seam and a triangular end cap of a filter bag as described herein may be located along the bottom edge 694 or the apex 695. Further, although body 680 includes only one longitudinal seam 682/683, one or more alternative embodiments of triangular filter bags as described herein may include two or more seams.

The triangular end cap of one or more embodiments of triangular filter bags as described herein may, with reference to the illustrative embodiment of triangular end cap 690, include two side edges 692 that extend between a bottom edge 694 and an apex 695. Described alternately, the side edges 692 of the triangular end cap 690 may be described as meeting at the apex 695 at a location distal from the bottom edge 694.

To provide a filter bag capable of removing particulate matter from air, the filter media of the body 680 at the closed end edge 684 is sealed to the side edges 692, bottom edge 694 and apex 695 of the triangular end cap 690 such that particulate matter is substantially prevented from passing through those junctions.

The triangular end cap 690 may, in one or more embodiments, define the generally triangular-shaped of the filter bag 640 along its length and will more definitely defined the triangular-shaped of the filter bag 640 proximate the triangular end cap 690. With reference to FIG. 19, the shape of the triangular end cap 690 can be described with reference to the included angle formed between the side edges 692 of the triangular end cap 690. In particular, the bottom edge 694, apex 695, and side edges 692 of the triangular end cap 690 may, in one or more embodiments, be described as defining an included angle α (alpha) between the side edges 692 at the apex 695 of 20° or less, 15° or less, 12° or less, 10° or less, or 5° or less. At a lower end, the angle α (alpha) may be, in one or more embodiments, 2° or more, 3° or more, 4° or more, or 5° or more.

The triangular end caps that may be used in one or more embodiments of triangular filter bags as described herein may alternatively be described with respect to the dimensions of the features of the triangular end cap. For example, the triangular end cap 690, when projected onto a flat surface along the bag axis 641 may, in one or more embodiments, define a height (h) between the apex 695 and the bottom edge 694. The projection of triangular end cap 690 may also define a width (w) across the bottom edge 694 between the side edges 692. In one or more embodiments of triangular filter bags as described herein, the height (h) is greater than the width (w). More particularly, in one or more embodiments, the height (h) defined between the bottom edge and the apex of a triangular end cap may be 4 or more, 6 or more, 8 or more, 10 or more, 12 or more, or 15 times or more the width (w) defined along the bottom edge between the sides of the triangular end. In one or more embodiments, the height (h) defined between the bottom edge and the apex of a triangular end cap may be, at an upper end, 20 or less, 15 or less, 12 or less, 10 or less, 8 or less, or 6 or less times the width (w) defined along the bottom edge between the sides of the triangular end. In one embodiment, the height (h) defined between the bottom edge and the apex of a triangular end cap may be 7 to 8 times the width (w) defined along the bottom edge between the sides of the triangular end. It should be noted that the height (h) is preferably measured along an end cap axis 691 that extends between the bottom edge 694 and the apex 695 and may, in one or more embodiments, be described as bisecting both the bottom edge 694 and the apex 695 and/or defining an axis of symmetry of the triangular end 690. In one or more embodiments of filter bags including triangular end caps as described herein, the triangular end may be constructed of filter media, e.g., the same filter media used for the body 680 of the filter bag. In one or more alternative embodiments, the triangular end caps may be constructed of materials that are impermeable to air (unlike the filter media used for the body 680). In one or more embodiments, the triangular end caps may be substantially rigid, self-supporting articles, while in other embodiments the triangle are end caps may be constructed of flexible materials that are not capable of self-support.

In one or more embodiments of filter bags including triangular end caps as described herein, the closed end edge 684 of the body 680 may be sealed to the side edges 692 of the triangular end cap 690 using any suitable technique or combination of techniques sufficient to provide structural integrity to that junction as well as limit/prevent passage of particulate matter through that junction. In one or more embodiments, the closed end edge may be sealed to the side edges using one or more of a sewn seam, a stitched seam, an adhesive seam, a chemically welded seam, and a thermally welded seam.

In one or more embodiments of filter bags including triangular end caps as described herein, the closed end edge 684 of the body 680 may be sealed to the bottom edge 694 of the triangular end cap 690 using any suitable technique or combination of techniques sufficient to provide structural integrity to that junction as well as limit/prevent passage of particulate matter through that junction. In one or more embodiments, the closed end edge may be sealed to the side edges using one or more of a sewn seam, a stitched seam, an adhesive seam, a chemically welded seam, and a thermally welded seam.

In one or more embodiments of filter bags including triangular end caps as described herein, the closed end edge 684 of the body 680 may be sealed to the apex 695 of the triangular end cap 690 using any suitable technique or combination of techniques sufficient to provide structural integrity to that junction as well as limit/prevent passage of particulate matter through that junction. In one or more embodiments, the closed end edge may be sealed to the side edges using one or more of a sewn seam, a stitched seam, an adhesive seam, a chemically welded seam, and a thermally welded seam.

With reference to FIG. 19, filter bag 640 also includes an optional cuff 649 attached to the filter media of the body 680 along the opening edge 685 of the body 680. The cuff 649 may, in one or more embodiments, be used to enhance sealing of the bag opening 643 to a flange assembly of a filter bag assembly as described herein. In one or more embodiments, the cuff 649 may be thicker than the filter media. In one or more embodiments, the cuff 649 may include one or more resilient, compressible materials or bodies (see, e.g., body 648 in FIG. 18) suitable to enhance a seal formed between the bag opening 643 and a flange assembly of a filter bag assembly as described herein.

Following are some illustrative embodiments of the air filter systems, filter bag assemblies, and filter bags described herein.

Embodiment A1 is an air filter system comprising: a tubesheet separating a housing into a dirty air chamber and a clean air chamber, wherein the tubesheet comprises an aperture placing the dirty air chamber in fluid communication with the clean air chamber, and wherein the housing comprises an access panel located across the dirty air chamber from the tubesheet; a filter bag assembly located in the dirty air chamber, the filter bag assembly comprising: a flange assembly comprising an interior face and a tubesheet face facing the tubesheet, the flange assembly surrounding the aperture in the tubesheet and comprising a clean air outlet extending through the flange assembly, the clean air outlet in fluid communication with the aperture in the tubesheet; a cage comprising a first cage end attached to the flange assembly and extending over a cage length to a second cage end distal from the flange assembly, the cage defining a cage axis extending between the first cage end and the second cage end, the cage further comprising a plurality of struts extending away from the interior face of the flange assembly towards the second cage end; and a filter bag comprising filter media defining an interior volume of the filter bag, wherein the filter bag extends from a first end to a second end, wherein a portion of the filter media defines a bag opening at the first end of the filter bag; wherein the bag opening is attached to flange assembly, wherein the bag opening and the flange assembly form a seal around the clean air outlet such that air entering the interior volume of the filter bag must pass through the filter media of the filter bag or through the clean air outlet of the flange assembly; a filter access port in the access panel of the housing, the filter access port comprising a cover movable between a closed position and an open position, wherein the cover closes the filter access port when the cover is in the closed position and wherein the filter bag assembly can be inserted into or removed from the dirty air chamber through the filter access port when the cover is in the open position; a seal located around the aperture in the tubesheet between the tubesheet face of the flange assembly and the tubesheet such that air passing through the aperture in the tubesheet must pass through the clean air outlet in the flange assembly before entering or leaving the interior volume of the filter bag; a seal actuator proximate the filter access port in the access panel, the seal actuator configured to apply a seal force on the second cage end through the second end of the filter bag, wherein the seal force is directed along the cage axis and is transferred to the seal through the cage and the flange assembly; and a pulse generator located in the clean air chamber and configured to deliver pulses of air into the interior volume of the filter bag through the aperture in the tubesheet and the clean air outlet of the flange assembly, the pulses of air passing through the aperture and the clean air outlet before reaching the interior volume of the filter bag.

Embodiment A2 is a version of Embodiment A1 in which the seal actuator comprises the cover of the filter access port, wherein, when the filter bag assembly is located in mounted on the filter guide in the dirty air chamber and the cover is in the closed position, the cover applies the seal force on the second cage end.

Embodiment A3 is a version of any one of Embodiments A1 or A2, wherein the flange assembly comprises a base comprising the tubesheet face of the flange assembly and a clamp configured to attach to the base on the interior face of the flange assembly, wherein the clean air outlet extends through the base and the clamp, and wherein the bag opening of the filter bag is retained between the clamp and the base on the interior face of the flange assembly.

Embodiment A4 is a version of Embodiment A3, wherein the bag opening, the clamp, and the base form the seal around the clean air outlet such that air entering the interior volume of the filter bag must pass through the filter media of the filter bag or through the clean air outlet of the flange assembly.

Embodiment A5 is a version of any one of Embodiments A1 to A4, wherein the system comprises a filter guide in the dirty air chamber, the filter guide extending along a guide axis passing through the tubesheet and the access panel, wherein the guide axis is aligned with the bag axis, and wherein the filter bag assembly is mounted on the filter guide, and, optionally, wherein the filter guide extends from the tubesheet to the access panel of the housing. Embodiment A6 is a version of Embodiment A5, wherein the flange assembly comprises a guide aperture, and wherein the filter guide passes through the guide aperture.

Embodiment A7 is a version of any one of Embodiments A1 to A6, wherein the system comprises a bag support configured to support the second end of the filter bag. Embodiment A8 is a version of Embodiment A7, wherein the bag support comprises a bag support connector attached to the filter bag proximate the second end of the filter bag, and a chamber connector positioned in the dirty air chamber proximate the access panel of the housing, wherein the bag support connector and the chamber connector are configured to interlock with each other to support the second end of the filter bag in the dirty air chamber, and, optionally, wherein the bag support connector comprises at least one of a hook and a loop. Embodiment A9 is a version of Embodiment A8, wherein the chamber connector is attached to the filter guide.

Embodiment A10 is a version of any one of Embodiments A1 to A9, wherein, in each cross-section taken in a plane transverse to the cage axis over a majority of the cage length, the plurality of struts define a triangle comprising a top vertex and a pair of bottom vertices opposite the top vertex, and wherein, when the cage is located in the filter bag, the filter media of the filter bag defines a pair of side surfaces and a bottom surface, wherein each side surface of the pair of side surfaces comprises a top edge proximate the top vertex of each triangle defined by the plurality of struts, and wherein each side surface of the pair of side surfaces comprises a bottom edge distal from the top edge, wherein the bottom edges of the side surfaces are proximate the bottom vertices of each triangle defined by the plurality of struts, and wherein the bottom surface of the filter media extends between the bottom edges of the side surfaces; and, optionally, wherein the top angle formed at the top vertex by the bottom vertices opposite the top vertex is 20° or less, 15° or less, 12° or less, 10° or less, or 5° or less; and, optionally, the top angle formed at the top vertex by the bottom vertices opposite the top vertex is 2° or more, 3° or more, 4° or more, or 5° or more.

Embodiment A11 it is a version of any one of Embodiments A1 to A10, wherein the bottom surface of the filter media comprises a width measured between the bottom edges of the side surfaces of the filter media in a direction transverse to the cage axis, and wherein each side surface comprises a height measured between the top edge and the bottom edge transverse to the cage axis, wherein the width of the bottom surface is 50% or less, 40% or less, 30% or less, 20% or less, 15% or less, 12% or less, 10% or less, 8% or less, or 5% or less of the height of either side surface of the pair of side surfaces and, optionally, wherein the width of the bottom surface is 4% or more, 5% or more, 6% or more, 8% or more, 10% or more, 12% or more, 15% or more of the height of either side surface of the pair of side surfaces.

Embodiment A12 is a version of any one of Embodiments A10 to A11, wherein the clean air outlet comprises an elongated shape extending from a top end to a bottom end, wherein an outlet axis extends between the top end and the bottom end of the clean air outlet, and wherein a projection of the outlet axis along the cage axis passes between the pair of bottom vertices of each triangle defined by the plurality of struts.

Embodiment A13 is a version of any one of Embodiments A10 to A12, wherein the plurality of struts comprises a top strut and a pair of bottom struts, wherein the top strut defines the top vertex of each triangle defined by the plurality of struts, and wherein the bottom struts define the bottom vertices of each triangle defined by the plurality of struts, and optionally, wherein a junction between the top strut and the flange assembly and junctions between each of the bottom struts and the flange assembly define a triangle on the flange assembly, and wherein the clean air outlet is located within the triangle defined by the junctions between the top strut and the bottom struts and the flange assembly.

Embodiment A14 is a version of any one of Embodiments A10 to A13, wherein each triangle defined by the plurality of struts comprises an acute, optionally isosceles, triangle.

Embodiment A15 is a version of any one of Embodiments A10 to A14, wherein the top vertex of each triangle defined by the plurality of struts is located between the filter guide and the bottom vertices of each triangle defined by the plurality of struts.

Embodiment A16 is a version of any one of Embodiments A1 to A15, wherein the pulse generator comprises a plurality of ports facing the aperture in the tubesheet, wherein air in the pulses of air passes through the plurality of ports.

Embodiment A17 is a version of any one of Embodiments A1 to A16, wherein the cage axis is oriented generally horizontally within the dirty air chamber, and wherein the housing comprises a hopper located below the filter bag assembly, wherein particulate matter dislodged from the filter media is urged towards the hopper under the force of gravity.

Embodiment A18 is a version of any one of Embodiments A1 to A17, wherein the filter guide is located outside of the interior volume of the filter bag.

Embodiment A19 is a version of any one of Embodiments A1 to A17, wherein the filter guide is located within the interior volume of the filter bag.

Embodiment B is use of an air filter system according to any one of Embodiments A1 to A19 to remove particulate matter from dirty air using the filter bag of the filter bag assembly.

Embodiment C21 is a filter bag assembly comprising: a flange assembly comprising an interior face and a tubesheet face, the flange assembly comprising a clean air outlet extending through the flange assembly, wherein the clean air outlet extends from a top end to a bottom end, wherein an outlet axis extends between the top end and the bottom end of the clean air outlet; a cage comprising a first cage end attached to the flange assembly and extending over a cage length to a second cage end distal from the flange assembly, the cage defining a cage axis extending between the first cage end and the second cage end, the cage further comprising a plurality of struts extending away from the interior face of the flange assembly towards the second cage end, wherein, in each cross-section taken in a plane transverse to the cage axis over a majority of the cage length, the plurality of struts define a triangle comprising a top vertex and a pair of bottom vertices opposite the top vertex; and a filter bag comprising filter media defining an interior volume of the filter bag, wherein the filter bag extends from a first end to a second end, wherein a portion of the filter media defines a bag opening at the first end of the filter bag; wherein the bag opening is attached to the flange assembly, wherein the bag opening and the flange assembly form a seal around the clean air outlet such that air entering the interior volume of the filter bag must pass through the filter media of the filter bag or through the clean air outlet of the flange assembly; wherein, when the cage is located in the filter bag, the filter media of the filter bag defines a pair of side surfaces and a bottom surface, wherein each side surface of the pair of side surfaces comprises a top edge proximate the top vertex of each triangle defined by the plurality of struts, and wherein each side surface of the pair of side surfaces comprises a bottom edge distal from the top edge, wherein the bottom edges of the side surfaces are proximate the bottom vertices of each triangle defined by the plurality of struts, and wherein the bottom surface of the filter media extends between the bottom edges of the side surfaces.

Embodiment C22 is a version of Embodiment C21, wherein the bottom surface of the filter media comprises a width measured between the bottom edges of the side surfaces of the filter media in a direction transverse to the cage axis that is less than a height, measured between the top edge and the bottom edge transverse to the cage axis, of either side surface of the pair of side surfaces of filter media, and, optionally, wherein the width of the bottom surface is 50% or less, 40% or less, 30% or less, 20% or less, 15% or less, 12% or less, 10% or less, 8% or less, or 5% or less of the height of either side surface of the pair of side surfaces, and, optionally, wherein the width of the bottom surface may be 4% or more, 5% or more, 6% or more, 8% or more, 10% or more, 12% or more, 15% or more of the height of either side surface of the pair of side surfaces.

Embodiment C23 is a version of any one of Embodiments C21 to C22, wherein an angle formed between the side surfaces at the top edge of each triangle defined by the plurality of struts is 45° or less, 30° or less, 20° or less, 15° or less, 12° or less, 10° or less, or 5° or less, and, optionally, the angle formed between the side surfaces at the top edge of each triangle defined by the plurality of struts is 2° or more, 3° or more, 4° or more, or 5° or more.

Embodiment C24 is a version of any one of Embodiments C21 to C23, wherein a projection of the outlet axis along the cage axis passes between the pair of bottom vertices of each triangle defined by the plurality of struts, and, optionally, wherein the projection of the outlet axis passes through the top vertex of each triangle defined by the plurality of struts.

Embodiment C25 is a version of any one of Embodiments C21 to C24, wherein the filter media of the filter bag comprises a continuous hoop of filter media, the continuous hoop of filter media extends from the bag opening to the second edge of the filter bag and wherein the filter bag comprises a seam located along the second end of the filter bag, wherein the seam closes the continuous hoop of filter media at the second end of the filter bag.

Embodiment C26 it is a version of any one of Embodiments C21 to C25, wherein the plurality of struts comprises a top strut and a pair of bottom struts, wherein the top strut defines the top vertex of each triangle defined by the plurality of struts, and wherein the bottom struts define the bottom vertices of each triangle defined by the plurality of struts, and, optionally, wherein a junction between the top strut and the flange assembly and junctions between each of the bottom struts and the flange assembly define a triangle on the flange assembly, and wherein the clean air outlet is located within the triangle defined by the junctions between the top strut and the bottom struts and the flange assembly.

Embodiment C27 is a version of any one of Embodiments C21 to C26, wherein each triangle defined by the plurality of struts comprises an acute, optionally isosceles, triangle.

Embodiment C28 is a version of any one of Embodiments C21 to C27, wherein the flange assembly comprises a base comprising the tubesheet face of the flange assembly and a clamp configured to attach to the base on the interior face of the flange assembly, wherein the clean air outlet extends through the base and the clamp, and wherein the bag opening of the filter bag is retained between the clamp and the base on the interior face of the flange assembly, and optionally, wherein the bag opening, the clamp, and the base form the seal around the clean air outlet such that air entering the interior volume of the filter bag must pass through the filter media of the filter bag or through the clean air outlet of the flange assembly.

Embodiment C29 is a version of any one of Embodiments C21 to C28, wherein the flange assembly comprises a guide aperture and, optionally, wherein the guide aperture is located above the cage and the top edges of the side surfaces formed by the filter media of the filter bag.

Embodiment C30 is a version of any one of Embodiments C21 to C29, wherein the filter bag comprises a bag support connector attached to the filter bag proximate the second end of the filter bag, the bag support located outside of the interior volume of the filter bag, and, optionally, wherein the bag support comprises at least one of a loop and a hook. Embodiment C31 is a version of Embodiment 30, wherein the bag support is attached to the filter bag proximate the top edges of the side surfaces of the filter media of the filter bag.

Embodiment C32 is a version of any one of Embodiments C21 to C31, wherein the filter bag assembly further comprises a pulse collector extending away from the tubesheet face of the flange assembly, the pulse collector surrounding the clean air outlet and configured to collect and pass air approaching the clean air outlet from the tubesheet face of the flange assembly through the clean air outlet.

Embodiment C33 is a version of any one of Embodiments C21 to C32, wherein the flange assembly comprises a sealing surface surrounding the clean air outlet on the tubesheet face of the flange assembly.

Embodiment D includes use of a filter bag assembly according to any one of Embodiments C21 to C33 to remove particulate matter from dirty air using the filter bag.

Embodiment E35 is an air filter system comprising: a tubesheet separating a housing into a dirty air chamber and a clean air chamber, wherein the tubesheet comprises an aperture placing the dirty air chamber in fluid communication with the clean air chamber, and wherein the housing comprises an access panel located across the dirty air chamber from the tubesheet; a filter guide in the dirty air chamber, the filter guide extending along a guide axis passing through the tubesheet and the access panel. The system includes a filter bag assembly mounted on the filter guide and located in the dirty air chamber, the filter bag assembly comprising: a flange assembly comprising an interior face and a tubesheet face facing the tubesheet, the flange assembly surrounding the aperture in the tubesheet and comprising a clean air outlet extending through the flange assembly, the clean air outlet in fluid communication with the aperture in the tubesheet, wherein the clean air outlet comprises an elongated shape extending from a top end to a bottom end, wherein an outlet axis extends between the top end and the bottom end of the clean air outlet; a cage comprising a first cage end attached to the flange assembly and extending over a cage length to a second cage end distal from the flange assembly, the cage defining a cage axis extending between the first cage end and the second cage end, the cage further comprising a plurality of struts extending away from the interior face of the flange assembly towards the second cage end, wherein, in each cross-section taken in a plane transverse to the cage axis over a majority of the cage length, the plurality of struts define a triangle comprising a top vertex and a pair of bottom vertices opposite the top vertex; and a filter bag comprising filter media defining an interior volume of the filter bag, wherein the filter bag extends from a first end to a second end, wherein a portion of the filter media defines a bag opening at the first end of the filter bag; wherein the bag opening is attached to flange assembly, wherein the bag opening and the flange assembly form a seal around the clean air outlet such that air entering the interior volume of the filter bag must pass through the filter media of the filter bag or through the clean air outlet of the flange assembly; wherein, when the cage is located in the filter bag, the filter media of the filter bag defines a pair of side surfaces and a bottom surface, wherein each side surface of the pair of side surfaces comprises a top edge proximate the top vertex of each triangle defined by the plurality of struts, and wherein each side surface of the pair of side surfaces comprises a bottom edge distal from the top edge, wherein the bottom edges of the side surfaces are proximate the bottom vertices of each triangle defined by the plurality of struts, and wherein the bottom surface of the filter media extends between the bottom edges of the side surfaces; a filter access port in the access panel of the housing, the filter access port comprising a cover movable between a closed position and an open position, wherein the cover closes the filter access port when the cover is in the closed position and wherein the filter bag assembly can be inserted into or removed from the dirty air chamber when the cover is in the open position, wherein, optionally, the cover acts on and forces the tubesheet face of the flange assembly against the tubesheet when the filter bag assembly is mounted on the filter guide and the cover is in the closed position; and a pulse generator located in the clean air chamber and configured to deliver pulses of air into the interior volume of the filter bag through the aperture in the tubesheet and the clean air outlet of the flange assembly, the pulses of air passing through the aperture and the clean air outlet before reaching the interior volume of the filter bag.

Embodiment E36 is a version of Embodiment E35, wherein the bottom surface of the filter media comprises a width measured between the bottom edges of the side surfaces of the filter media in a direction transverse to the cage axis that is less than a height, measured between the top edge and the bottom edge transverse to the cage axis, of either side surface of the pair of side surfaces of filter media, and, optionally, wherein width of the bottom surface is 50% or less, 40% or less, 30% or less, 20% or less, 15% or less, 12% or less, 10% or less, 8% or less, or 5% or less of the height of either side surface of the pair of side surfaces, and, optionally, wherein the width of the bottom surface may be 4% or more, 5% or more, 6% or more, 8% or more, 10% or more, 12% or more, 15% or more of the height of either side surface of the pair of side surfaces.

Embodiment E37 is a version of any one of Embodiments E35 to E36, wherein an angle formed between the side surfaces at the top edge of each triangle defined by the plurality of struts is 45° or less, 30° or less, 20° or less, 15° or less, 12° or less, 10° or less, or 5° or less, and, optionally, the angle formed between the side surfaces at the top edge of each triangle defined by the plurality of struts is 2° or more, 3° or more, 4° or more, or 5° or more.

Embodiment E38 is a version of any one of Embodiments E35 to E37, wherein a projection of the outlet axis along the cage axis passes between the pair of bottom vertices of each triangle defined by the plurality of struts, and optionally, wherein the projection of the outlet axis passes through the top vertex of each triangle defined by the plurality of struts.

Embodiment E39 is a version of any one of Embodiments E35 to E38, wherein the filter media of the filter bag comprises a continuous hoop of filter media, the continuous hoop of filter media extends from the bag opening to the second edge of the filter bag, and wherein the cover acts on the second cage end to force the flange assembly against the tubesheet when the filter bag assembly is mounted on the filter guide and the cover is in the closed position.

Embodiment E40 is a version of any one of Embodiments E35 to E39, wherein the plurality of struts comprises a top strut and a pair of bottom struts, wherein the top strut defines the top vertex of each triangle defined by the plurality of struts, and wherein the bottom struts define the bottom vertices of each triangle defined by the plurality of struts, and, optionally, wherein a junction between the top strut and the flange assembly and junctions between each of the bottom struts and the flange assembly define a triangle on the flange assembly, and wherein the clean air outlet is located within the triangle defined by the junctions between the top strut and the bottom struts and the flange assembly.

Embodiment E41 is a version of any one of Embodiments E35 to E40, wherein each triangle defined by the plurality of struts comprises an acute, optionally isosceles, triangle.

Embodiment E42 is a version of any one of Embodiments E35 to E41, wherein the flange assembly comprises a base comprising the tubesheet face of the flange assembly and a clamp configured to attach to the base on the interior face of the flange assembly, wherein the clean air outlet extends through the base and the clamp, and wherein the bag opening of the filter bag is retained between the clamp and the base on the interior face of the flange assembly, and, optionally, wherein the bag opening, the clamp, and the base form the seal around the clean air outlet such that air entering the interior volume of the filter bag must pass through the filter media of the filter bag or through the clean air outlet of the flange assembly.

Embodiment E43 is a version of any one of Embodiments E35 to E42, wherein the flange assembly comprises a guide aperture, and wherein the filter guide passes through the guide aperture and, optionally, wherein the guide aperture is located above the cage and the top edges of the side surfaces formed by the filter media of the filter bag.

Embodiment E44 is a version of any one of Embodiments E35 to E43, wherein the filter guide extends from the tubesheet to the access panel of the housing.

Embodiment E45 is a version of any one of Embodiments E35 to E44, wherein the system comprises a bag support configured to support the second end of the filter bag. Embodiment E46 is a version of Embodiment E45, wherein the bag support comprises a bag support connector attached to the filter bag proximate the second end of the filter bag, and a chamber connector positioned in the dirty air chamber proximate the access panel of the housing, wherein the bag support connector and the chamber connector are configured to interlock with each other to support the second end of the filter bag in the dirty air chamber, and, optionally, wherein the bag support connector comprises at least one of a hook and a loop. Embodiment E47 is a version of Embodiment E46, wherein the chamber connector is attached to the filter guide.

Embodiment E48 is a version of any one of Embodiments E35 to E47, wherein a flange assembly seal is located between the tubesheet face of the flange assembly and the tubesheet.

Embodiment E49 is a version of any one of Embodiments E35 to E48, wherein the pulse generator comprises a plurality of ports facing the aperture in the tubesheet, wherein air in the pulses of air passes through the plurality of ports, and, optionally, wherein the plurality of ports are arranged along a port axis aligned with the outlet axis. Embodiment E50 is a version of Embodiment E49, wherein the port closest to the bottom end of the clean air outlet is larger than the port closest to the top end of the clean air outlet.

Embodiment E51 is a version of any one of Embodiments E35 to E50, wherein the cage axis is oriented generally horizontally within the dirty air chamber such that the bottom surface of the filter media faces downward. Embodiment E52 is a version of Embodiment E51, wherein the housing comprises a hopper located below the filter bag assemblies, wherein particulate matter dislodged from the filter media is urged towards the hopper under the force of gravity, and wherein particulate matter on the bottom surface of the filter media is dislodged directly into the hopper.

Embodiment F includes use of an air filter system according to any one of Embodiments E35 to E52 to remove particulate matter from dirty air using the filter bag of the filter bag assembly.

Embodiment G54 is an air filter system comprising: a tubesheet separating a housing into a dirty air chamber and a clean air chamber, wherein the tubesheet comprises an aperture placing the dirty air chamber in fluid communication with the clean air chamber, and wherein the housing comprises an access panel located across the dirty air chamber from the tubesheet; a filter bag assembly located in the dirty air chamber, the filter bag assembly comprising a flange assembly covering the aperture in the tube sheet, a cage comprising a first end attached to the flange assembly, the cage extending away from the flange assembly to a second end proximate the access panel, and a filter bag comprising a bag opening sealed within the flange assembly, wherein the cage is located in an interior volume of the filter bag with the second end of the cage proximate a closed end of the filter bag; an access port in the access panel proximate the second end of the cage, wherein the filter bag assembly passes through the access port during placement in and removal from the dirty air chamber; and means for forcing the flange assembly against the tubesheet by applying a compression force on the second end of the cage, wherein the compression force acts on the second end of the cage through the filter bag.

Embodiment G55 is a version of Embodiment G54, wherein a seal is located around the aperture in the tubesheet between the flange assembly and the tubesheet such that air passing through the aperture in the tubesheet must pass through a clean air outlet in the flange assembly before entering or leaving the interior volume of the filter bag.

Embodiment G56 is a version of any one of Embodiments G54 to G55, wherein the means for forcing the flange against the tubesheet comprises a cover closing the access port, wherein the cover applies the compression force on the second end of the cage through the filter bag when the cover closes the access port.

Embodiment G57 is a version of any one of Embodiments G54 to G56, the system comprising a filter guide in the dirty air chamber, wherein the flange assembly is supported on the filter guide when moving towards and away from the tubesheet.

Embodiment G58 is a version of Embodiment G57, wherein the filter guide extends generally horizontally across the dirty air chamber and wherein the system comprises a filter bag assembly support located outside of the interior volume of the filter bag, the filter bag support configured to support the filter bag assembly proximate the closed end of the filter bag.

Embodiment G59 is a version of any one of Embodiments G57 to G58, wherein the filter guide is located outside of the interior volume of the filter bag. Embodiment G60 is a version of Embodiment G57, wherein the filter guide is located within the interior volume of the filter bag.

Embodiment G61 is a version of any one of Embodiments G54 to G60, wherein the system comprises means for supporting the closed end of the filter bag. Embodiment G62 is a version of Embodiment G61, wherein the means for supporting the closed end of the filter bag comprises a bag support connector attached to the filter bag and a chamber connector positioned in the dirty air chamber proximate the access panel, wherein the bag support connector and the chamber connector are configured to interlock with each other to support the filter bag in the dirty air chamber, and, optionally, wherein the bag support connector comprises at least one of a hook and a loop. Embodiment G63 is a version of Embodiment G62, wherein the chamber connector is attached to the filter guide.

Embodiment G64 is a version of any one of Embodiments G54 to G63, wherein the filter bag assembly defines a cage axis extending away from the flange assembly and through the second end of the cage, and wherein, in each cross-section taken in a plane transverse to a cage axis over a majority of the cage, the cage forces the filter bag into a substantially triangular shape, and optionally, wherein the substantially triangular shapes of the filter bag each comprise a pair of side surfaces meeting proximate a top vertex and a bottom surface spanning between the side surfaces, and, optionally, wherein a top angle formed at the top vertex by the side surfaces is 20° or less, 15° or less, 12° or less, 10° or less, or 5° or less, and, optionally, the top angle is 2° or more, 3° or more, 4° or more, or 5° or more.

Embodiment H65 is use of a system according to any one of Embodiments G54 to G64 to remove particulate matter from dirty air using the filter bag of the filter bag assembly.

Embodiment I66 is a method of sealing a filter bag over an aperture in a tubesheet of an air filter system, the method comprising: positioning a filter bag assembly in a dirty air chamber of an air filter system with a flange assembly of the filter bag assembly located proximate the tubesheet, wherein a bag opening of a filter bag of the filter bag assembly is located over the aperture in the tubesheet, and wherein the flange assembly covers the aperture; and forcing the flange assembly against the tubesheet by applying a compression force on a cage located in an interior volume of the filter bag, wherein the cage is attached to the flange assembly and extends away from the flange assembly towards a closed end of the filter bag; wherein air passing through the aperture in the tubesheet from the dirty air chamber must pass through the filter bag before reaching the aperture.

Embodiment I67 it is a version of Embodiment I66, wherein the compression force is applied on the cage through the filter bag.

Embodiment I68 is a version of any one of Embodiments I66 to I67, wherein the compression force is applied by closing an access port into the dirty air chamber, wherein the access port is located across the dirty air chamber from the tubesheet.

Embodiment I69 is a version of any one of Embodiments I66 to I68, wherein the positioning the filter bag assembly in the dirty air chamber comprises passing the filter bag assembly into the dirty air chamber through the access port. Embodiment I70 is a version of Embodiment I69, wherein the filter bag is attached to the flange assembly before the filter bag assembly is passed into the dirty air chamber through the access port.

Embodiment J71 is use of a triangular filter bag in an air filter system comprising an array of two or more of the triangular filter bags arranged generally horizontally within a dirty air chamber, wherein a bottom surface of each triangular filter bag is oriented in a generally horizontal position.

Embodiment J72 is a version of Embodiment J71, wherein each triangular bag comprises two side surfaces extending away from the bottom surface, the two side surfaces oriented in a generally vertical position.

Embodiment J73 is a version of any one of Embodiments J71 to J72, wherein the two side surfaces of each triangular filter bag meet above the bottom surface, and wherein, optionally, the two side surfaces define an included angle between them of 20° or less, 15° or less, 12° or less, 10° or less, or 5° or less, and, optionally, the included angle is 2° or more, 3° or more, 4° or more, or 5° or more.

Embodiment J74 is a version of any one of Embodiments J71 to J73, wherein each triangular bag contains a generally horizontally extending cage in an interior volume, the cage extending from a bag opening to a closed end of the bag, wherein the cage optionally comprises a triangular shape. Embodiment J75 is a version of Embodiment J74, wherein the bag opening is sealed over an aperture in a tubesheet at least in part by a compression force acting on the closed end of the bag and the cage in a direction towards the open end of the filter bag. Embodiment J76 is a version of embodiment J75, wherein the compression force acting on each of the triangular filter bags is provided by a cover closing an access opening into the dirty chamber, the cover acting on the closed end of the bag and the cage. Embodiment J77 as a version of embodiment J76, wherein, for each of the triangular filter bags, the cover closing the access opening into the dirty chamber comprises a triangular embossment having a shape that is complementary to the triangular shape of the triangular filter bag at the closed end of the filter bag and/or a triangular shape of the cage located in the interior volume of the triangular bag. Embodiment J78 is a version of either one of embodiments J76 or J77, wherein, for each of the triangular filter bags, the cover closing the access opening into the dirty chamber comprises a triangular embossment having a shape that is complementary to a triangular shape of the cage located in the interior volume of the triangular bag.

Embodiment J79 is a version of any one of Embodiments J71 to J79, wherein each triangular filter bag is removed from the dirty air chamber by withdrawing the triangular filter bag from the dirty air chamber in a generally horizontal direction.

Embodiment K80 is a triangular filter bag comprising an opening, a closed end, a body extending from the opening to the closed end along a bag axis extending between the opening to the closed end, and a substantially triangular end cap attached to the body at the closed end; wherein the body comprises filter media taking a tubular shape that defines an interior volume between the opening and the closed end, wherein the filter media comprises a closed end edge at the closed end of the bag and an opening edge at the opening of the bag; wherein the triangular end cap comprises a bottom edge and two side edges extending away from the bottom edge, wherein the side edges meet at an apex of the triangular end cap that is distal from the bottom edge; and wherein the filter media at the closed end edge of the body is sealed to the bottom edge, the apex, and the two side edges of the triangular end cap.

Embodiment K81 is a version of embodiment K80, wherein the bottom edge, apex, and two side edges of the triangular end cap define an included angle between the side edges at the apex of 20° or less, 15° or less, 12° or less, 10° or less, or 5° or less, and, optionally, the included angle is 2° or more, 3° or more, 4° or more, or 5° or more.

Embodiment K82 is a version of any one of Embodiments K80 to K81, wherein the triangular end cap, when projected onto a flat surface along the bag axis, defines a height between the apex and the bottom edge and also defines a width across the bottom edge between the side edges, wherein the height is 4 or more, 6 or more, 8 or more, 10 or more, 12 or more, or 15 or more times the width, and, optionally, wherein the height is 20 or less, 15 or less, 12 or less, 10 or less, 8 or less, or 6 or less times the width.

Embodiment K83 is a version of any one of Embodiments K80 to K81, wherein the triangular end cap, when projected onto a flat surface along the bag axis, defines a height between the apex and the bottom edge and also defines a width across the bottom edge between the side edges, wherein the height is 7 to 8 times the width.

Embodiment K84 is a version of any one of Embodiments K80 to K83, wherein the triangular end cap comprises filter media. Embodiment K85 is a version of any one of Embodiments K80 to K83, wherein the triangular end cap is impermeable to air.

Embodiment K86 is a version of any one of Embodiments K80 to K85, wherein the body comprises a longitudinal seam extending from the closed end edge to the open edge. Embodiment K87 is a version of embodiment K86, wherein a junction of the longitudinal seam with the triangular end cap is located along one of the side edges of the triangular end cap between the bottom edge and the apex of the triangular end cap.

Embodiment K88 is a version of any one of Embodiments K80 to K87, wherein the closed end edge is sealed to the side edges of the triangular end cap using one or more of: a sewn seam, a stitched seam, an adhesive seam, a chemically welded seam, and a thermally welded seam.

Embodiment K89 is a version of any one of Embodiments K80 to K88, wherein the closed end edge is sealed to the bottom edge of the triangular end cap using one or more of: a sewn seam, a stitched seam, an adhesive seam, a chemically welded seam, and a thermally welded seam.

Embodiment K90 is a version of any one of Embodiments K80 to K89, wherein the closed end edge is sealed to the apex of the triangular end cap using one or more of: a sewn seam, a stitched seam, an adhesive seam, a chemically welded seam, and a thermally welded seam.

Embodiment K91 is a version of any one of Embodiments K80 to K90, wherein a bottom edge seam between the closed end edge and the bottom edge of the triangular end cap is different than a side edge seam between the closed end edge and one or both of the side edges of the triangular end cap.

Embodiment K92 is a version of any one of Embodiments K80 to K91, wherein the filter bag comprises a cuff attached to the filter media along the opening edge of the body. Embodiment K93 is a version of embodiment K92, wherein the cuff is thicker than the filter media. Embodiment K94 is a version of any one of Embodiments K92 to K93, wherein the cuff comprises resilient compressible material.

Embodiment K95 is a version of any one of Embodiments K80 to K94, wherein a bag support connector is attached to an exterior of the body proximate the closed end. Embodiment K96 is a version of embodiment K95, wherein the bag support connector comprises one of a hook and a loop. Embodiment K97 is a version of any one of embodiments K95 to K96, wherein the bag support connector is attached to the body proximate the apex of the triangular end cap.

Embodiment L98 is a filter bag comprising an opening, a closed end, a body extending from the opening to the closed end along a bag axis extending between the opening to the closed end, wherein the body comprises filter media taking a tubular shape that defines an interior volume between the opening and the closed end, and wherein the filter bag comprises a bag support connector attached to an exterior of the body proximate the closed end.

Embodiment L99 is a version of embodiment L98, wherein the bag support connector comprises one of a hook and a loop.

Embodiment L100 is a version of any one of Embodiments L98 to L99, wherein the filter media comprises a closed end edge at the closed end of the bag and an opening edge at the opening of the bag; and wherein the filter bag comprises a triangular filter bag comprising a triangular end cap comprises a bottom edge and two side edges extending away from the bottom edge, wherein the side edges meet at an apex of the triangular end cap that is distal from the bottom edge; and wherein the filter media at the closed end edge of the body is sealed to the bottom edge, the apex, and the two side edges of the triangular end cap. Embodiment L101 is a version of embodiment L100, wherein the bottom edge, apex, and two side edges of the triangular end cap define an included angle between the side edges at the apex of 20° or less, 15° or less, 12° or less, 10° or less, or 5° or less, and, optionally, the included angle is 2° or more, 3° or more, 4° or more, or 5° or more.

Embodiment L102 is a version of any one of Embodiments L100 to L101, wherein the triangular end cap, when projected onto a flat surface along the bag axis, defines a height between the apex and the bottom edge and also defines a width across the bottom edge between the side edges, wherein the height is 4 or more, 6 or more, 8 or more, 10 or more, 12 or more, or 15 or more times the width, and, optionally, wherein the height is 20 or less, 15 or less, 12 or less, 10 or less, 8 or less, or 6 or less times the width.

Embodiment L103 is a version of any one of Embodiments L100 to L101, wherein the triangular end cap, when projected onto a flat surface along the bag axis, defines a height between the apex and the bottom edge and also defines a width across the bottom edge between the side edges, wherein the height is 7 to 8 times the width.

Embodiment L104 is a version of any one of Embodiments L100 to L103, wherein the triangular end cap comprises filter media.

Embodiment L105 is a version of any one of Embodiments L100 to L103, wherein the triangular end cap is impermeable to air.

Embodiment L106 is a version of any one of Embodiments L100 to L105, wherein the body comprises a longitudinal seam extending from the closed end edge to the open edge wherein a junction of the longitudinal seam with the triangular end cap is located along one of the side edges of the triangular end cap between the bottom edge and the apex of the triangular end cap.

Embodiment L107 is a version of any one of Embodiments L100 to L106, wherein the closed end edge is sealed to the side edges of the triangular end cap using one or more of: a sewn seam, a stitched seam, an adhesive seam, a chemically welded seam, and a thermally welded seam.

Embodiment L108 is a version of any one of Embodiments L100 to L107, wherein the closed end edge is sealed to the bottom edge of the triangular end cap using one or more of: a sewn seam, a stitched seam, an adhesive seam, a chemically welded seam, and a thermally welded seam.

Embodiment L109 is a version of any one of Embodiments L100 to L108, wherein the closed end edge is sealed to the apex of the triangular end cap using one or more of: a sewn seam, a stitched seam, an adhesive seam, a chemically welded seam, and a thermally welded seam.

Embodiment L110 is a version of any one of Embodiments L100 to L109, wherein a bottom edge seam between the closed end edge and the bottom edge of the triangular end cap is different than a side edge seam between the closed end edge and one or both of the side edges of the triangular end cap.

Embodiment L111 is a version of any one of Embodiments L100 to L110, wherein the filter bag comprises a cuff attached to the filter media along the opening edge of the body. Embodiment L112 is a version of embodiment L111, wherein the cuff comprises resilient compressible material.

The complete disclosure of the patents, patent documents, and publications identified herein are incorporated by reference in their entirety as if each were individually incorporated. To the extent there is a conflict or discrepancy between this document and the disclosure in any such incorporated document, this document will control.

Illustrative embodiments of the filter bags, filter bag assemblies, air filter systems and components thereof, as well as methods of using the same, are discussed herein some possible variations have been described. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof. It should also be understood that this invention also may be suitably practiced in the absence of any element not specifically disclosed as necessary herein.

The invention claimed is:

1. A method of sealing a filter bag over an aperture in a tubesheet of an air filter system, the method comprising:
    positioning a filter bag assembly in a dirty air chamber of an air filter system with a flange assembly of the filter bag assembly located proximate the tubesheet, wherein the filter bag assembly includes a filter bag having a bag opening and a closed end spaced apart from the bag opening, and wherein the filter bag assembly is positioned such that the bag opening is located over the aperture in the tubesheet and the flange assembly covers the aperture; and
    forcing the flange assembly against the tubesheet by applying a compression force on a cage attached to the flange assembly, wherein the cage is located in an interior volume of the filter bag and extends away from the flange assembly towards the closed end of the filter bag;
    wherein air passing through the aperture in the tubesheet from the dirty air chamber must pass through the filter bag before reaching the aperture.

2. A method according to claim 1, wherein the compression force is applied on the cage through the filter bag.

3. A method according to claim 1, wherein the positioning the filter bag assembly in the dirty air chamber comprises passing the filter bag assembly into the dirty air chamber through an access port.

4. A method according to claim 1, wherein the positioning the filter bag assembly in the dirty air chamber comprises passing the filter bag assembly into the dirty air chamber through an access port, and wherein the filter bag is attached to the flange assembly before the filter bag assembly is passed into the dirty air chamber through the access port.

5. A method of sealing a filter bag over an aperture in a tubesheet of an air filter system, the method comprising:
    positioning a filter bag assembly in a dirty air chamber of an air filter system with a flange assembly of the filter bag assembly located proximate the tubesheet, wherein a bag opening of a filter bag of the filter bag assembly is located over the aperture in the tubesheet, and wherein the flange assembly covers the aperture; and
    forcing the flange assembly against the tubesheet by applying a compression force on a cage located in an interior volume of the filter bag, wherein the cage is attached to the flange assembly and extends away from the flange assembly towards a closed end of the filter bag, wherein the compression force is applied by closing an access port into the dirty air chamber, wherein the access port is located across the dirty air chamber from the tubesheet;

wherein air passing through the aperture in the tubesheet from the dirty air chamber must pass through the filter bag before reaching the aperture.

6. A method according to claim 5, wherein the compression force is applied on the cage through the filter bag.

7. A method according to claim 5, wherein the positioning the filter bag assembly in the dirty air chamber comprises passing the filter bag assembly into the dirty air chamber through the access port.

8. A method according to claim 5, wherein the positioning the filter bag assembly in the dirty air chamber comprises passing the filter bag assembly into the dirty air chamber through the access port, and wherein the filter bag is attached to the flange assembly before the filter bag assembly is passed into the dirty air chamber through the access port.

* * * * *